United States Patent [19]
Takahashi et al.

[11] Patent Number: 5,813,380
[45] Date of Patent: Sep. 29, 1998

[54] SUCTION CONTROL DEVICE FOR MULTIPLE CYLINDER INTERNAL COMBUSTION ENGINE

[75] Inventors: Akira Takahashi; Toru Hashimoto; Mitsuhiro Miyake; Shigekazu Yamauchi, all of Tokyo; Hideo Kakinuma, Odawara; Kiyoshi Shinjyo, Odawara; Shigeyuki Ishiguro, Odawara; Naruo Tsukakoshi, Yokohama; Hisakazu Miya, Yokohama; Naoto Nishimoto, Yokohama, all of Japan

[73] Assignees: Mitsubishi Jidosha Kogyo Kabushiki Kaisha; Mikuni Corporation, both of Tokyo; Tokyo Roki Corporation, Kanagawa, all of Japan

[21] Appl. No.: 501,008

[22] PCT Filed: Dec. 12, 1994

[86] PCT No.: PCT/JP94/02083

§ 371 Date: Oct. 16, 1995

§ 102(e) Date: Oct. 16, 1995

[87] PCT Pub. No.: WO95/16112

PCT Pub. Date: Jun. 15, 1995

[30] Foreign Application Priority Data

Dec. 10, 1993 [JP] Japan .................................. 5-310916
Dec. 10, 1993 [JP] Japan .................................. 5-310917
Dec. 10, 1993 [JP] Japan .................................. 5-310918
Dec. 10, 1993 [JP] Japan .................................. 5-310919

[51] Int. Cl.⁶ .............................. F01L 1/00; F16C 27/00
[52] U.S. Cl. ...................................................... 123/184.55
[58] Field of Search ......................... 123/184.55, 184.61, 123/184.53

[56] References Cited

U.S. PATENT DOCUMENTS

| 4,862,840 | 9/1989 | Matsunaga et al. | 123/184.55 |
| 4,907,547 | 3/1990 | Daly | 123/184.53 |
| 5,033,417 | 7/1991 | Van Basshuysen et al. | 123/184.55 |
| 5,243,933 | 9/1993 | Mukawa | 123/184.61 |
| 5,492,088 | 2/1996 | Ohrnbegger | 123/184.55 |
| 5,546,900 | 8/1996 | Adamek et al. | 123/184.55 |

FOREIGN PATENT DOCUMENTS

| 3-67056 | 3/1991 | Japan . |
| 4-27370 | 5/1992 | Japan . |
| 4-503548 | 6/1992 | Japan . |
| 4-308332 | 10/1992 | Japan . |
| 5-26261 | 7/1993 | Japan . |

*Primary Examiner*—Marguerite McMahon
*Attorney, Agent, or Firm*—Hill, Steadman & Simpson

[57] ABSTRACT

A suction control device for a multiple cylinder internal combustion engine comprising a shell body presenting a suction path communication to each cylinder in a multiple cylinder internal combustion engine, a rotary shaft (21a) penetrating and born by the shell body, a butterfly valve (21) supported by the rotary shaft and provided in each of the suction paths so that it can freely open or close the suction path, and a restricting means for restricting movement of the rotary shaft in the axial direction; wherein the rotary shaft and the butterfly valve are monolithically formed with a resin material, the shell body is made from a resin material, and the restricting means comprises an expanding piece (21b) monolithically formed on the rotary shaft and having a width in the radial direction thereof, a contact wall (24) formed on the shell body and slidably contacting and supporting the expanding piece, and a resilient energizing member (33) for energizing the expanding piece to contact it to the contact wall. With this feature, the weight reduction of the device can be achieved and also the rotary shaft can bee accurately and precisely supported in the thrust direction and can be prevented from becoming loose.

5 Claims, 23 Drawing Sheets

FIG. I

SUCTION CONTROL DEVICE FOR MULTIPLE CYLINDER INTERNAL COMBUSTION ENGINE

BACKGROUND OF THE INVENTION

1. Field of the Invention

The present invention relates to a suction control device for a multiple cylinder internal combustion engine incorporated in a vehicle or the like, and more particularly to a suction control device for a multiple cylinder internal combustion engine with specific features in the butterfly valve opening and closing a suction path and the bearing of the rotary shaft therefor, and the tightening construction between members thereof.

2. Background Technology

Conventionally, so-called a variable suction system, in which a length of a suction pipe and a path capacity are switched in two stages according to such factors as a rotational speed of an engine or a load or the like to give an inertia supercharge effect or a resonance supercharge effect to intake air for the purpose to improve output from the engine, has been employed as a suction system for an engine.

FIG. 1 shows a cross sectional view of the suction control device wherein the variable suction system described above is employed for a six-cylinder engine. In this figure, a cross section of one suction path corresponding to one-cylinder of engine is shown, but actually the suction paths corresponding to six cylinders thereof are formed monolithically in parallel in a direction vertical to the sheet carrying this figure.

In the suction control device described above, the intake air introduced from a side end of the body into a surge tank 1 via a throttle valve (not shown herein) is introduced into an engine cylinder, passes through a roundabout suction path 3 as shown by the arrow A when a switch valve 2, which is a butterfly valve, is closed by operation of an actuator (not shown) if the speed is in a range of low or medium level (a state shown by a solid line), while, if in a range of high speed, the switch valve 2 is in the open state (a state shown by a two-dot chair line), and the intake air is directly introduced into the engine cylinder without passing through a roundabout suction path 3 as shown by the arrow B.

Namely, by opening and closing the switch valve 2, pressure inverted wave generated through a long suction pipe is synchronized in a low and medium range of speed and that generated through a short suction pipe is synchronized in a high range of speed for thereby improving the charging efficiency in the entire range of speed, thus improvement of torque in a low/medium speed range and that of maximum output power being achieved concurrently.

Also, in the suction control device employing the variable suction system as described above, a body section thereof presenting a suction path as well as a surge tank or others is molded by using aluminum material, and the changing valve 2 as well as the rotary shaft 2a therefor are molded by using steel or the like.

And because of the restrictions in the molding technology as described above, a suction control device is separated into three areas, namely a branch portion (I) forming only a suction path, a valve body portion (II) presenting a changing valve 2 therein which is a multiple butterfly valve and also forming a suction path, and a cover portion (III) forming a surge tank 1 and presenting a port shell 4 therein constituting a portion of the roundabout suction path 3, and each of the three portions is molded discretely, and then each of the mounting flange surfaces is monolithically butt-jointed to each other by using a connecting means (not shown) such as bolts and nuts or the like.

Furthermore, as for the multiple butterfly valve, as shown in FIG. 2, a concave notch is formed in a portion corresponding to each suction path of a line of the rotary shaft 2a, a valve 2 is fixed by using a tightening means such as a bolt 2b in this area, and a driving means comprising, for instance, an arm 2 and an actuator 5 is connected in one end of the rotary shaft 2a with the above-described valve 2 fixed thereto, so that all valves can monolithically be rotated.

Also, as for an assembly method and a supporting method for this multiple butterfly valve, as shown in FIG. 3, the rotary shaft bearing hole 6 is formed by drilling or the like so that the rotary shaft bearing hole is orthogonal to each of the suction path from the outer side of the valve body portion (II), then the rotary shaft 2a is inserted from the open outer side of the bearing hole 6, and after that the valve 2 is fixed to the rotary shaft with a small screw 2b in each suction path.

In this case, the rotary shaft 2a is supported in the radial direction by the internal wall of the bearing hole 6 itself. On the other hand, the rotary shaft 2a is supported in the thrust direction, as shown in FIG. 3, by providing a spring 7 energizing the rotary shaft 2a in the direction indicated by the arrow and associated with one end of the rotary shaft 2a, and also bringing the peripheral side 2d of the valve 2 into contact with the internal wall of the suction path 8.

In the supporting construction in the thrust direction described above, a spring 7 having a spring constant within a specified range is required to be selected so that scuffings do not occur in the engaged sliding section between the peripheral side 2d of the valve 2 and the internal wall of the suction path, and also a selectable width thereof is limited. Also, the valve and the internal wall of suction path are sometimes deformed, which may cause the rotary shaft not to rotate smoothly because of a partial abrasion caused by increase of local bearing stress under the effects of atmospheric temperature or displacement of the alignment.

Also, in the bearing construction as described above, if there occurs a change of a clearance in the bearing section due to difference in coefficients of thermal expansion in a case where the rotary shaft 2a and the valve body 1 are formed with different types of materials respectively, change of a clearance in the bearing section due to deterioration over time such as a abrasion, or dispersion of clearance in the bearing section due to dispersion in a manufactured size are generated, the change of a clearance as described above can not be compensated, and for this reason, the rotary shaft 2a may rattle and tap in the bearing hole, and the valve body may contact the internal wall of the suction path. And more particularly in a case of a multiple butterfly valve, the bearing stress of the bearing section becomes partially larger, so that the bearing section has a tendency to become loose due to abrasion or plastic deformation, because a torque delivery means such as an actuator 3 is provided in one end of the multiple butterfly valve although it has a long size.

As a structure for connection between a surge tank and a throttle body in the conventional technology, the structure as shown in FIG. 4 to FIG. 6 has been known.

Herein, FIG. 4 shows a plan view of a suction device for engine, and in this case the suction control device is separated into three areas, namely a branch portion (I) forming only a suction path, a valve body portion (II) presenting a switch valve which is a multiple butterfly valve and forming a suction path, and a covering portion (III) forming a surge tank and presenting a port shell therein constituting a portion of the roundabout suction path, and each of the portions is discretely molded by using aluminum material, then the mounting flange surfaces are monolithically butt-jointed to each other by using a connecting means (not shown) such as bolts or others.

Also, a flange section 100a having an opening is provided on the portion of the peripheral wall of the valve body (II) forming the surge tank and the covering portion (III), and the throttle body 200 presenting the throttle valve therein for adjusting output of engine is fixed and tightened with bolts 300 by contacting the flange section 200a to the flange section 100a. It should be noted that the throttle body 200 described above is also formed with aluminum material, and the rotary drum 200d, to which wire or the like is hooked, is fixed to one end of the rotary shaft 200c supporting the throttle valve (not shown) provided in the suction path, and the throttle valve can be opened or closed by rotating the rotary drum 200d.

Herein, detailed description is made for structure for connecting the throttle body 200 to the flange section 100a of the body of suction device 100, and as shown in FIG. 5 illustrating a cross section of the throttle body taken along the line A—A in FIG. 4, a screw hole 100s is formed in a flange section 100a of the body of suction device (totally 4 pieces of screws each at four corners), and on the other hand a through-hole 200h is formed in the flange section 200a of the throttle body (also 4 pieces totally). And a bolt 300 with a flat washer or a spring washer 500 assembled thereto is screwed into the screw hole 100s by inserting through the through-hole 200h described above in a state where both end surfaces of the both flanges are engaged and connected to each other through the seal member 400, then the both end surfaces are firmly connected and tightened to each other.

Also, another structure for connection is shown in FIG. 6. Herein, the through-hole 100h is formed in place of a screw hole in the flange section 100a of the body of suction device and the both flanges are connected to each other with a bolt 300 and nut 700 through a flat washer 500 and spring washer 600.

By the way, as one of the policies for development of more advanced, the possibilities of development of low fuel-consumption vehicles by reducing weight thereof, and also development of low-cost vehicles by changing materials or simplifying production process thereof have been investigated.

For this reason, in the suction device as described above, conventionally molded from metal materials such as aluminum material or the like, the possibility of manufacturing the products with resin has been investigated as part of the efforts for development of more advanced vehicles.

However, even if the components constituting the conventional type of suction control device are formed with resin, there arise such new problems as that mechanical strength of resin materials is weak and a degree of assembling precision is lower because of effects by lower heat-transfer properties or lower molding precision in each components thereof as compared to those of metal materials.

Also, even if all components constituting the conventional type of suction device is formed with resin, when the conventional type of connecting structure is employed and the throttle body is fixed thereby, there arise such new problems as that mechanical strength of the resin flange section is weak, the connecting section is loosened due to the settling of the flange section caused by heat creep or the like, forming of screw holes is difficult, and post-processing thereof is also difficult, so that it is found difficult to insure the connecting strength and reliability of the components at the same level as those in the conventional technology.

SUMMARY OF THE INVENTION

The present invention was made in the light of the circumstances as described above, and it is a first object of the present invention to provide a suction control device for a multiple cylinder internal combustion engine in which functions the device should have by nature can accurately and precisely be operated and also which enables weight reduction in products.

A second object of the present invention is to provide a suction control device for a multiple cylinder internal combustion engine in which required function can precisely be operated especially by precise positioning to the device body of a multiple butterfly valve and also which enables weight reduction in products.

A third object of the present invention is to provide a suction control device for a multiple cylinder internal combustion engine in which a bearing section for a rotary shaft can be prevented from becoming loose without being affected by materials for molding, peripheral temperature, or deterioration of materials over time and the bearing section can achieve the original functions at a high precision without fail, and also which enables weight reduction in products.

A fourth object of the present invention is to provide a suction control device for a multiple cylinder internal combustion engine having a structure for connection between of a surge tank and a throttle body which enables firmer connection between the two components by maintaining the connecting strength in the initial stage and an easier work for connection even if a connecting flange section is formed with a resin material of which mechanical strength is weak.

The suction control device for a multiple cylinder internal combustion engine according to the present invention comprises a shell body presenting a suction path communicated to each cylinder in a multi-cylinder internal combustion engine, a rotary shaft penetrating and born by the shell body, and a butterfly valve supported by the rotary shaft and provided in each of the suction paths so that it can freely open or close the suction path, and is characterized in that the butterfly valve and the rotary shaft are made from a monolithically molded resin material, and the shell body is formed with a resin material.

Also the suction control device for a multiple cylinder internal combustion engine comprises a shell body presenting a suction path communicated to each cylinder in a multiple cylinder internal combustion engine, a rotary shaft penetrating through and born by the shell body, and a butterfly valve supported by the rotary shaft and provided in each of the suction paths so that it can freely open or close the suction path, and is characterized in that a peculiar form hole having a cross section other than a circle is formed in the butterfly valve, the rotary shaft has the same cross section in a direction perpendicular to the axial line as that of the peculiar form hole, and the rotary shaft is inserted into and engaged with the peculiar form hole to penetrate through and support each butterfly valve provided in the suction path.

With the suction control device for a multiple cylinder internal combustion engine according to the present invention, the butterfly valve and the rotary shaft are monolithically formed with a resin material, so that an internal stress due to heat does not occur because coefficients of the thermal expansion of the valve and the rotary shaft are identical even when the engine is affected by heat from outside, and also orientation of resin fiber becomes identical in the engagement section between the valve and the rotary shaft because they are monolithically made, and for this reason the mechanical strength can be insured.

In addition, with the penetrated butterfly valve, the valve can be engaged with the rotary shaft without using the conventional type of connecting means, so that functions of the butterfly valve can sufficiently be achieved.

Also, the suction control device for a multiple cylinder internal combustion engine according to the present invention comprises a shell body presenting a suction path communicated to each cylinder in a multiple cylinder internal combustion engine, a rotary shaft penetrating through and born by the shell body, a butterfly valve supported by the rotary shaft and provided in each of the suction paths so that it can freely open or close the suction path, and a restricting means for restricting movement of the rotary shaft in the axial direction, and is characterized in that the butterfly valve and the rotary shaft are monolithically formed with a resin material, the shell body is made from a resin material, and the restricting means comprises an expanding piece monolithically formed on the rotary shaft and having a width in the radial direction thereof, a contact wall formed on the shell body and slidably contacting and supporting the expanding piece, and a resilient energizing member for energizing the expanding piece to contact it to the contact wall.

Also, the suction control device for a multiple cylinder internal combustion engine according to the present invention comprises a shell body presenting a suction path communicated to each cylinder in a multiple cylinder internal combustion engine, a rotary shaft penetrating through and born by the shell body, a butterfly valve supported by the rotary shaft and provided in each of the suction paths so that it can freely open or close the suction path, a driving means for driving the rotary shaft, and a restricting means for restricting movement of the rotary shaft in the axial direction, and is characterized in that the driving means has a torque delivery rotary member engaging and connected to one end section of the rotary shaft, the restricting means has a contact piece contacting an end face of the torque delivery rotary member from outside of the rotary shaft in the axial direction thereof, and the resilient energizing member for contacting the other end of the rotary shaft from outside thereof in the axial direction and energizing rotary shaft toward the contact piece.

With the suction control device according to the present invention, as the expanding piece formed monolithically on the rotary shaft is contacted to the contact wall formed on the shell body, the movement of the rotary shaft in the axial direction is restricted and energized by the resilient energizing member, it is possible to prevent the rotary shaft from becoming loose. With this feature, each butterfly valve supported by the rotary shaft can accurately execute opening/closing operation at the specified position of the suction path.

Also, the movement of the rotary shaft as described above can also be restricted by the contact piece contacting an outer end face of the torque delivery rotary member delivering torque to the rotary shaft, and by resilient energizing member energizing the rotary shaft toward the contact piece at the other end of the rotary shaft, so that opening/closing operation of the butterfly valve can accurately be executed without generating rattling therein.

Also, the suction control device for a multiple cylinder internal combustion engine according to the present invention comprises a shell body presenting a suction path communicated to each cylinder in a multiple cylinder internal combustion engine, a rotary shaft penetrating through and born by the shell body, a bearing supporting the rotary shaft in the radial direction, a butterfly valve supported by the rotary shaft and provided in each of the suction paths so that it can freely open or close the suction path, and is characterized in that the bearing has an engagement section which is engaged in a hole for engagement provided on an external wall of the shell body and a bearing section engaged in the axial direction of the rotary shaft and supporting the rotary shaft in the radial direction, and a resilient contact piece energizing the rotary shaft in the radial direction is monolithically formed in the bearing section.

With the suction control device according to the present invention, for instance, the multiple butterfly valve in the suction device is provided at a specified position of the suction path formed in the valve body which is the shell body, then positioning is made by engaging the engagement section of the bearing in the hole for engagement provided on the valve body and the bearing section is engaged in the rotary shaft when the rotary shaft is supported to the valve body described above. In this state, the resilient contact piece formed monolithically on the bearing section all the time energizes the rotary shaft in the radial direction. Even if the sliding section is worn out or a clearance thereto changes, the resilient contact piece always follows and compensates the change, so that the rotary shaft in the bearing hole can be prevented from being loosened therein.

Furthermore, in the suction control device for a multiple cylinder internal combustion engine according to the present invention, a flange section of the throttle body for adjusting output from the engine is contacted to a surge tank flange section forming a portion of a suction system for the multiple cylinder internal combustion engine and the two flange sections are connected to each other by the connecting means, and the suction control device according to the present invention is characterized in that the surge tank flange section is made from a resin material and at the same time the connecting means comprises a bolt penetrating through a through-hole provided between the surge tank flange section and the flange section of the throttle body and a nut screwed into the bolt, furthermore the nut comprises a cylindrical screw section having a female screw groove in the internal wall and a rectangular flange one end having a width in the radial direction in one end of the cylindrical screw section in the axial direction thereof, and the surge tank flange section has a U-shaped notched engagement groove opening toward outside in the direction of a flange surface of the flange section and also has a projection for contacting the cylindrical screw section to an internal periphery of the notched engagement groove in a state where the cylindrical screw section is inserted into and engaged in the notched engagement groove and pressing the cylindrical screw section to the bottom of the notched engagement groove.

In the suction control device according to the present invention, the nut is one with flange comprising a cylindrical screw section and a flange section, and the engagement section at which the nut with flange is connected to the flange section is a U-shaped notched engagement groove opening toward outside in the direction of a flange surface of the flange section, and furthermore the projection for making partially narrow the groove width of the engagement groove is formed in the internal wall of the groove, so that when the cylindrical screw section of the nut with flange is inserted into and engaged in the notched engagement groove described above, the projection is deformed in a range of resilience to enable its insertion, and the external periphery of the cyrindrical screw section is held and fixed thereby according to the elastic recovery of the projection after the insertion.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 15 is a side view showing a state where the rotary shaft is supported; FIG. 16 is a side view showing the state where a pair of engaging pieces are disengaged from each other, FIG. 17 is a plan view showing the state in FIG. 16; and FIG. 18 is a cross-sectional view showing the same state as that in FIG. 16 taken along the line F—F in FIG. 17.

FIG. 29 is mounted from outside of the valve body (II) to support the rotary shaft.

FIG. 36 is a perspective view illustrating appearance of an flange section made from resin and a nut with flange, and FIG. 37 is a view showing the state where the nut with flange is engaged in the notched engagement groove.

BEST MODE FOR CARRYING OUT THE PRESENT INVENTION

Description is made hereinafter for a first embodiment of the suction control device for a multiple cylinder internal combustion engine according to the present invention with reference to the related drawings.

Figure 7:
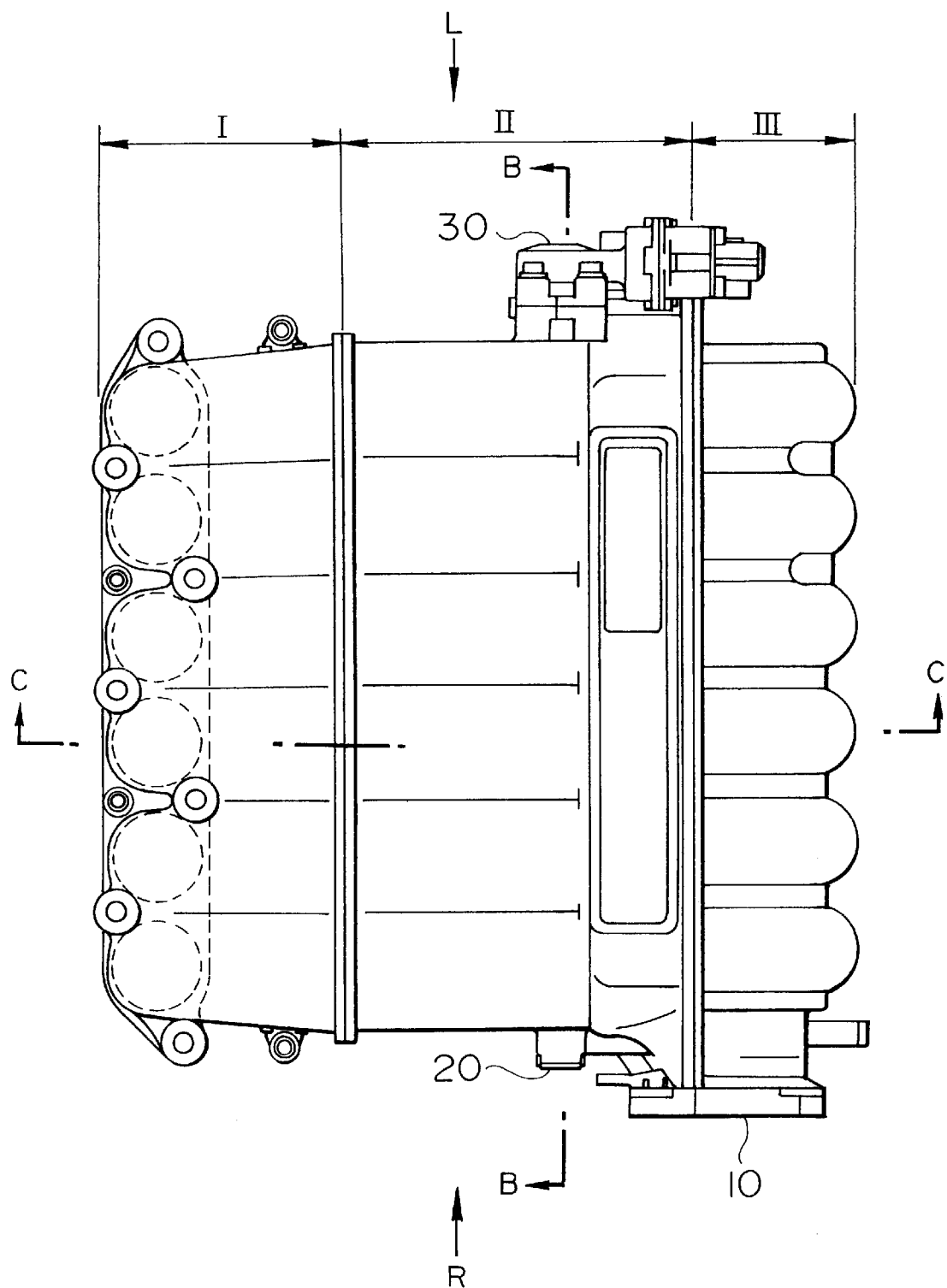
FIG. 7 shows a plan view of the suction control device according to embodiments of the present invention.

FIG. 7 shows a plan view illustrating appearance of the suction control device, and as shown in the figure, the suction control device comprises a combination of resin injection molding components forming three areas of I, II, and III respectively. Namely, the portion of blanch (I) connected to the head air inlet port of the engine, the portion of valve body (II) as a shell body presenting therein a multiple butterfly valve which is a switch valve for intake air, and the covering portion (III) forming the surge tank and the roundabout suction path each are formed by the method of injection molding discretely, and then the components are monolithically connected with each other through each flange surface for engagement by means of vibration welding or the like.

Figure 8:
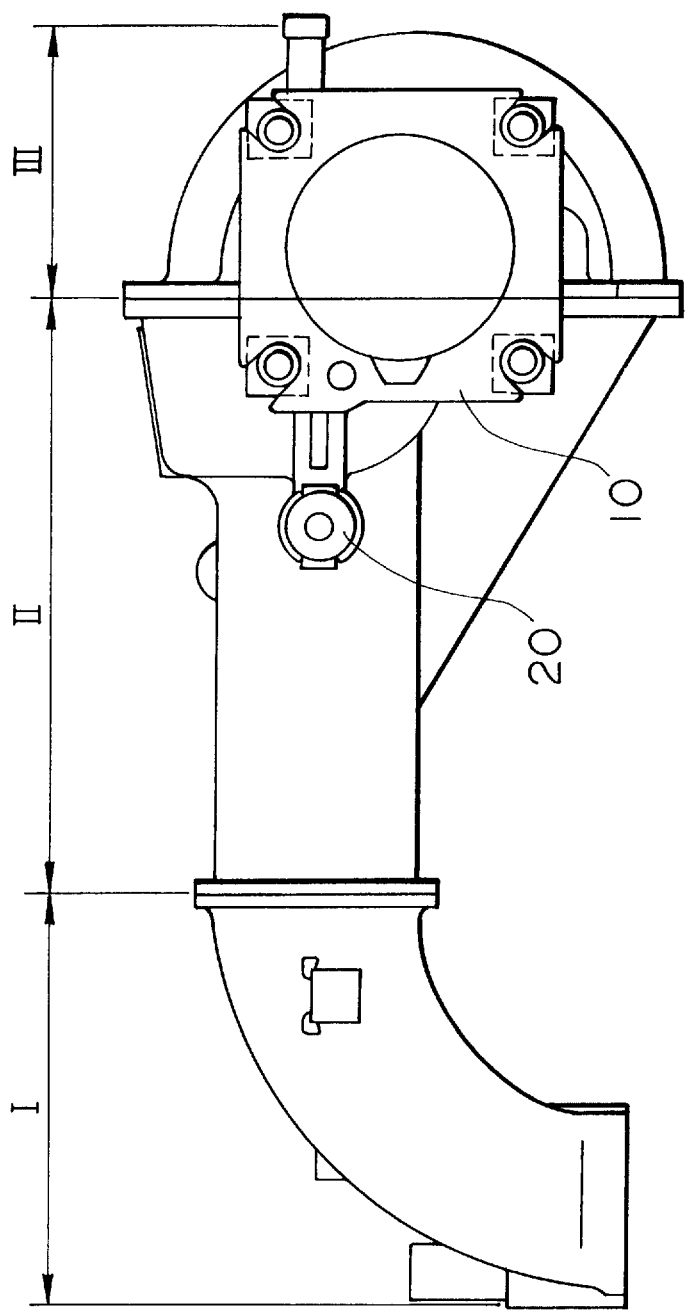
FIG. 8 shows a side view illustrating appearance of the suction control device from the point of the arrow R shown in FIG. 7.

FIG. 8 shows a side view illustrating appearance of the suction control device from the point of the arrow R shown in FIG. 7, and as shown in the figure, and the flange section 10 for mounting thereto the throttle body adjusting output from the engine is formed herein.

Figure 9:
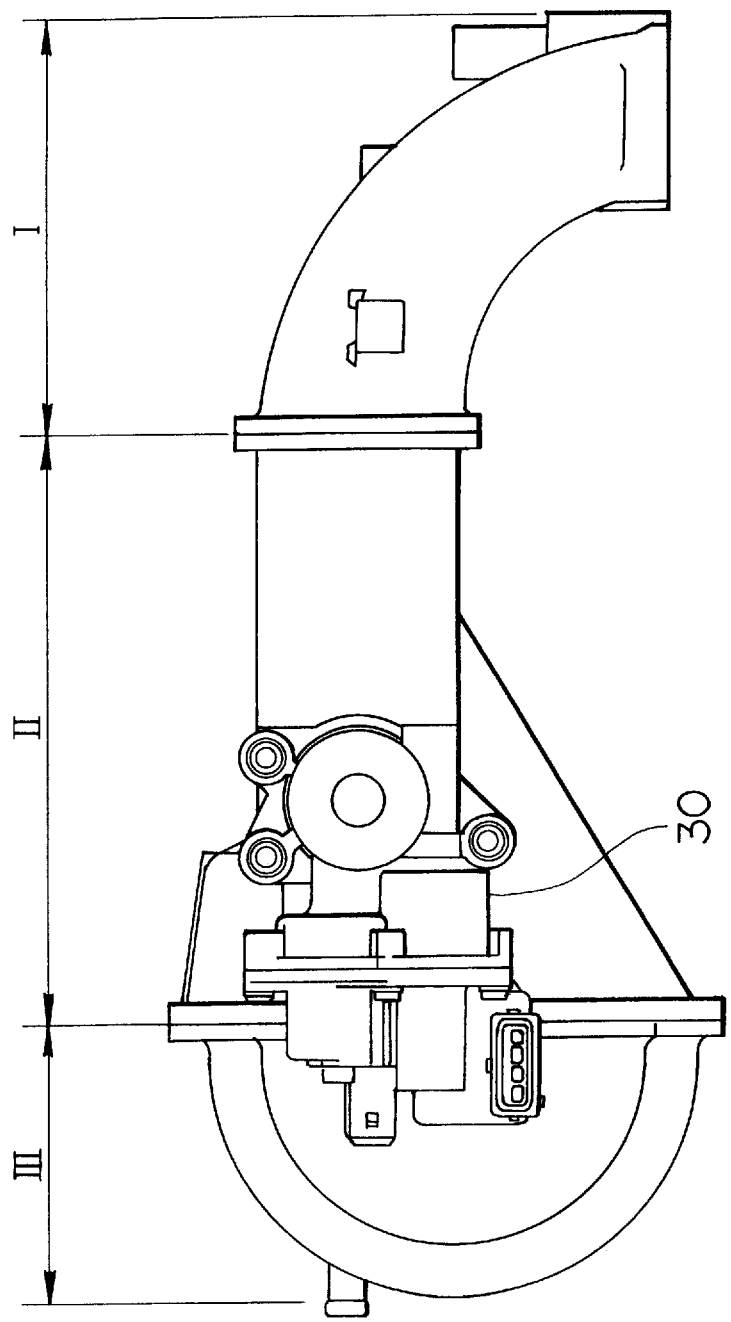
FIG. 9 shows a side view illustrating an appearance of the suction control device from the point of the arrow L shown in FIG. 7.

FIG. 9 shows a side view illustrating the suction control device from the point of the arrow L shown in FIG. 7, and, as shown in the figure, the actuator 30 presenting therein a gear system driving the multiple butterfly valve provided therein is mounted to the peripheral side described above.

It should be noted that the reference numeral 20 shown in FIG. 7 and FIG. B indicates appearance of the edge bearing supporting one edge of the rotary shaft for the valve in the radial direction, and the rotary shaft of the multiple butterfly valve is provided at this position.

Figure 10:
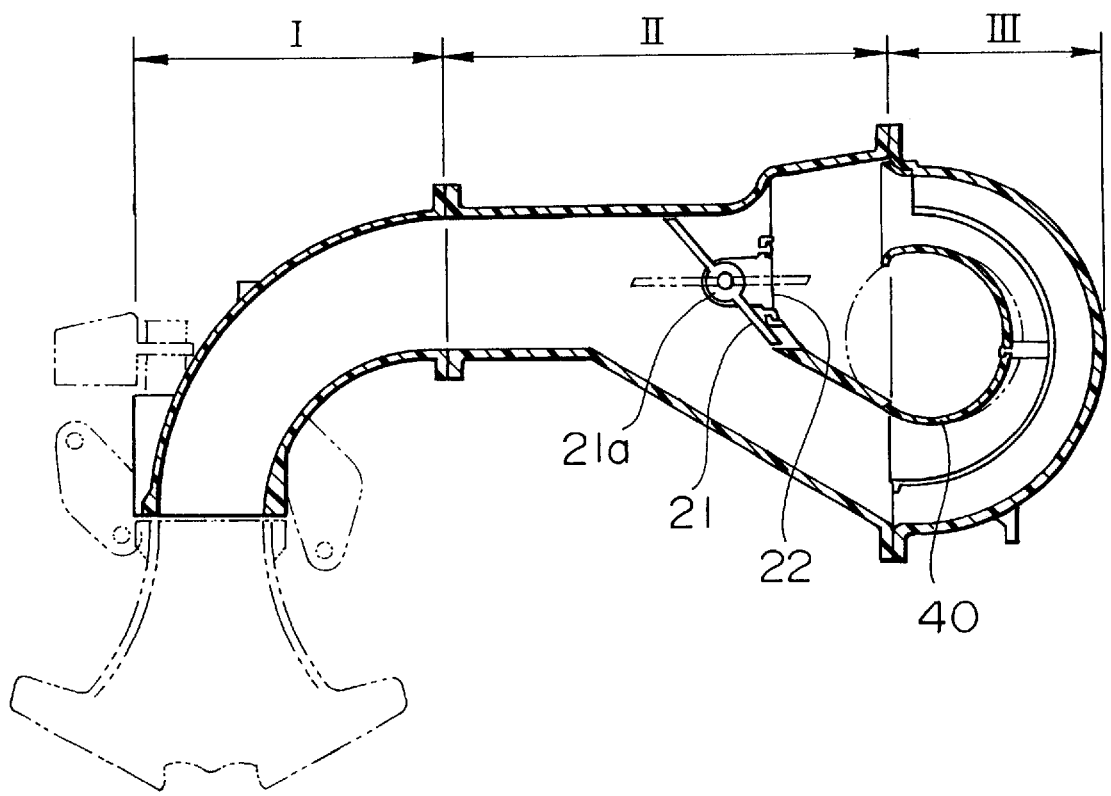
FIG. 10 shows a cross-sectional view illustrating the suction control device taken along the line C—C in FIG. 7.

FIG. 10 shows a cross-sectional view illustrating the suction control device taken along the line C—C in FIG. 7. As shown in this figure, inside the portion of valve body (II), a monolithic type of the multiple butterfly valve in which the butterfly valve 21 and the rotary shaft 21a are monolithically formed with a resin material is provided in the suction path supported by the intermediate bearing 22 so that it can freely rotate. Also, inside the portion of cover (III), the port shell 40 for forming the roundabout suction path is provided and fixed by contacting the internal wall of the portion of cover (III).

Figure 11:
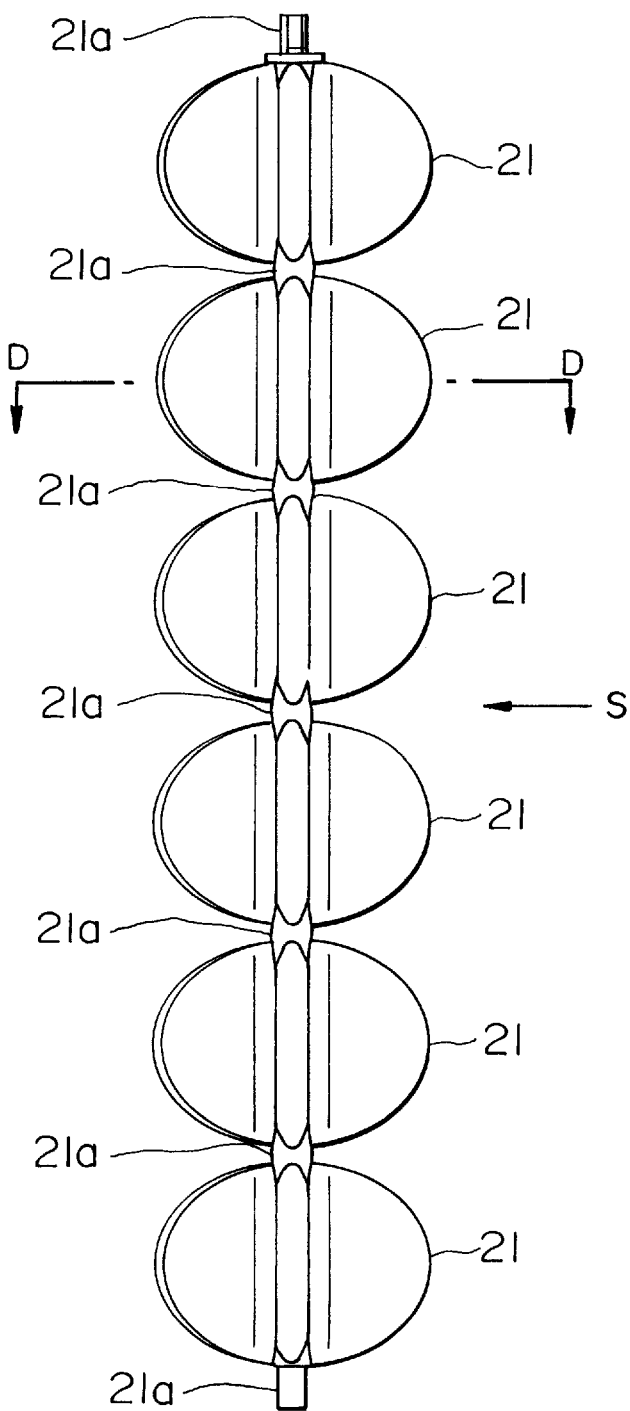
FIG. 11 shows a plan view illustrating a monolithic type of the multiple butterfly valve of the suction control device according to the present invention.

Herein, detailed description is made further for the monolithic type of multiple butterfly valve and the bearing portion therefor. As shown in FIG. 11, six pieces of butterfly valves 21 corresponding to the intake air inlet port of the six-cylindrical engine are monolithically formed together with the rotary shaft 21a supporting the butterfly valve so that it can freely rotate by using a resin material or the like according to the method of injection molding.

Also, by forming monolithically a butterfly valve 21 and a rotary shaft 21a as described above, a work for fixing them with screws as required in the conventional technology is not required any more, and in addition, a distance between butterfly valves can precisely be formed if previously taking into consideration contraction and deformation of the molding resin used for molding. Also, use of resin also enables weight reduction thereof, and for this reason, bearing stress in each of the supporting section of bearing 20 and 22 can be reduced.

Figure 12:
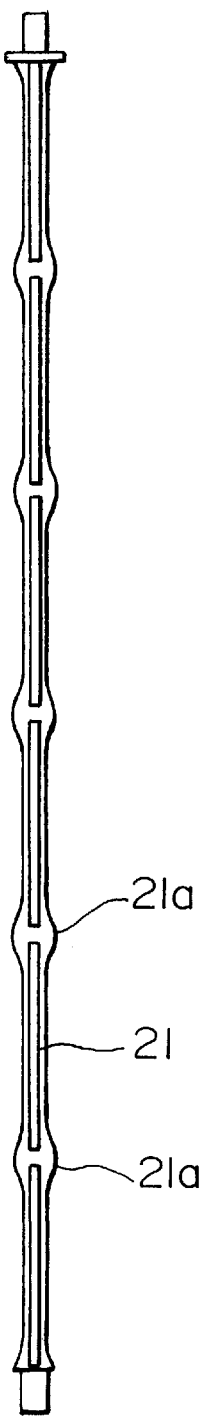
FIG. 12 shows a side view illustrating the same as described above from a point of the arrow S shown in FIG. 11.

Also, as shown in FIG. 12, by smoothly forming a connection area between the rotary shaft 21a connecting butterfly valves 21 to each other and each butterfly valve 21 with a curved surface R therebetween, resin can smoothly be filled in a mold die, and also concentration of stress in the connection area described above can be mitigated.

Figure 13:
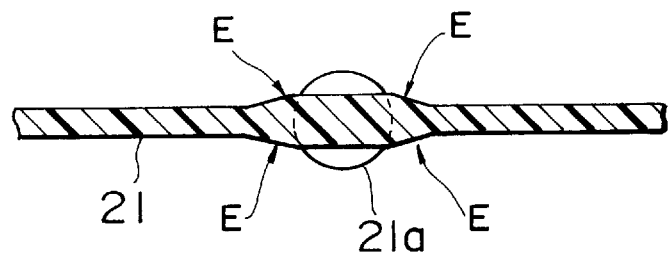
FIG. 13 shows a cross-sectional view illustrating the butterfly valve taken along the line D—D in FIG. 11.

Furthermore, as shown in the cross-sectional view taken along the line D—D in FIG. 13, in the connection area of the butterfly valve 21 with the rotary shaft 21a, the thick (padding) section E is provided to realize a streamlined form. The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense. With this feature, flexural rigidity of the butterfly valve in the rotating direction and a deflecting direction of the rotary shaft is improved, and flow resistance of an intake air can be reduced and inertia supercharge or resonant supercharge can more efficiently be acted in a state where the butterfly valve is provided in the suction path.

Figure 14:
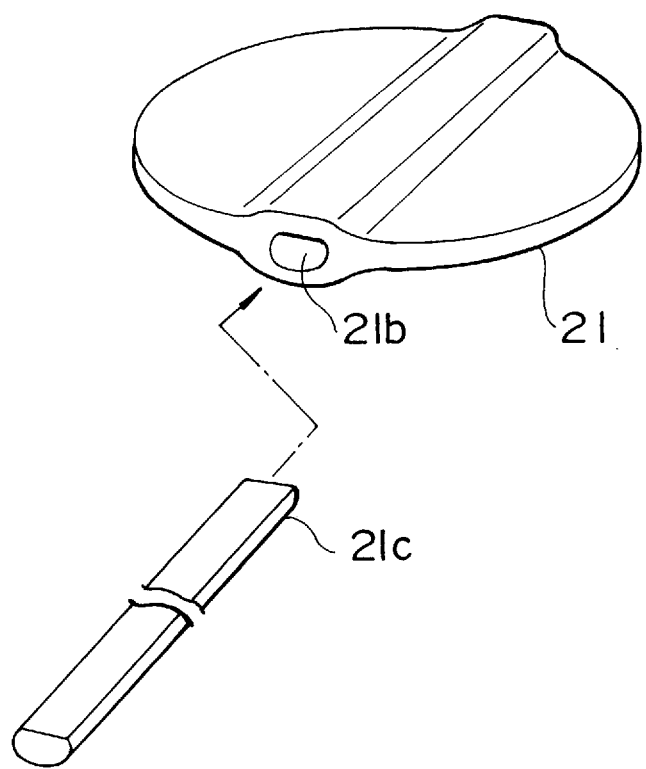
FIG. 14 is a partial perspective view illustrating appearance of the penetrated butterfly valve of the suction control device according to the embodiment of the present invention.

The multiple butterfly valve described above is such that the butterfly valve and the rotary shaft are monolithically formed, but even if a butterfly valve and a rotary shaft are formed separately like in the conventional technology, as shown in FIG. 14, if the hole for engagement of the butterfly valve is formed with a peculiar form 21b other than a circle and a rotary shaft 21c having a cross section engaged in the peculiar form hole 21b is formed, the butterfly valve and the rotary shaft become monolithic when engaged to each other, and for this reason, a specified connecting means such as a screw is not required. Namely it is a preferable structure from the point of reduction in a number of components thereof.

Next description is made for a bearing rotatably supporting the rotary shaft of the monolithic type of multiple butterfly valve.

Figure 1:
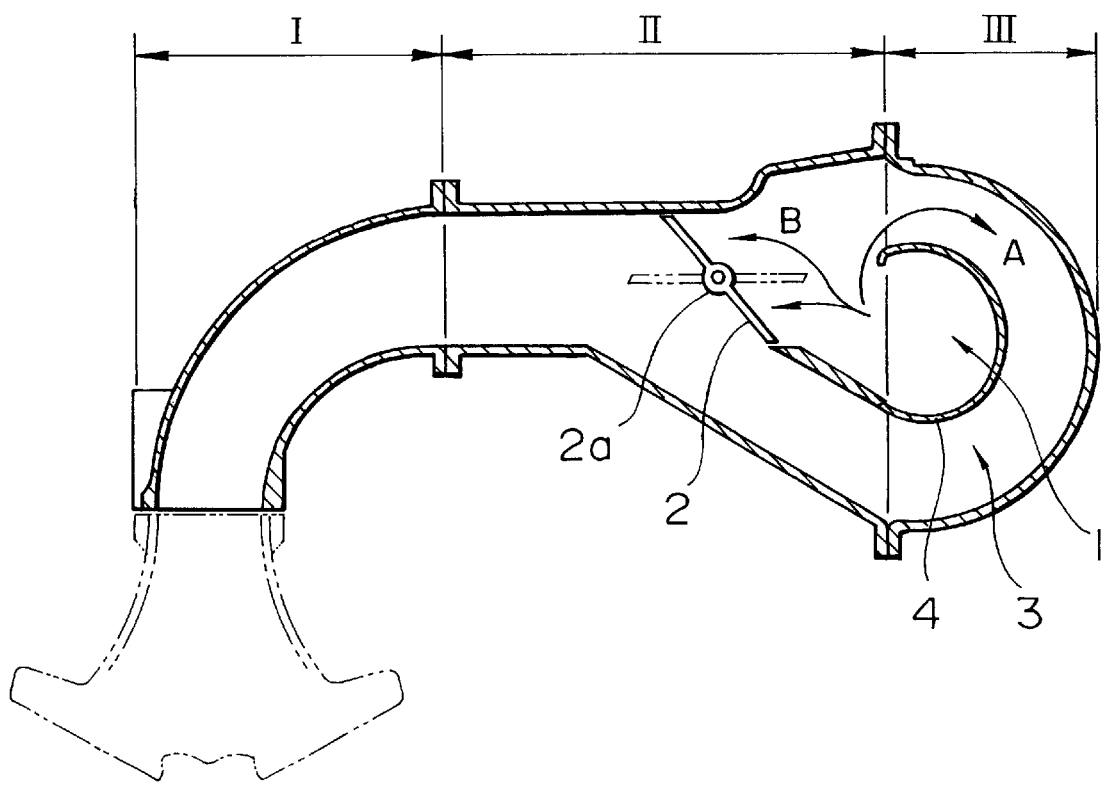
FIG. 1 shows a cross-sectional view of the conventional type of suction control device.
Figure 2:
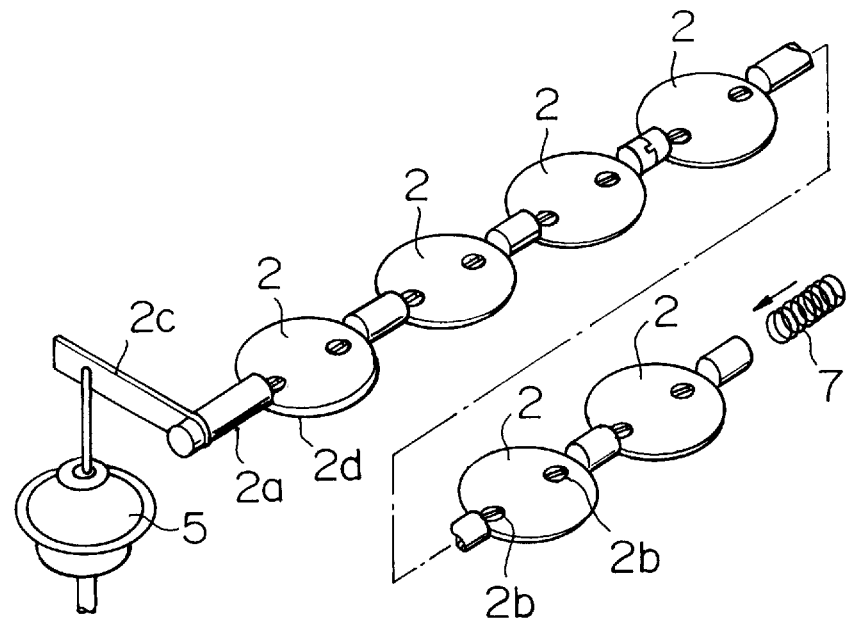
FIG. 2 shows a schematic perspective view illustrating a multiple butterfly valve used in the conventional type of suction control device.
Figure 3:
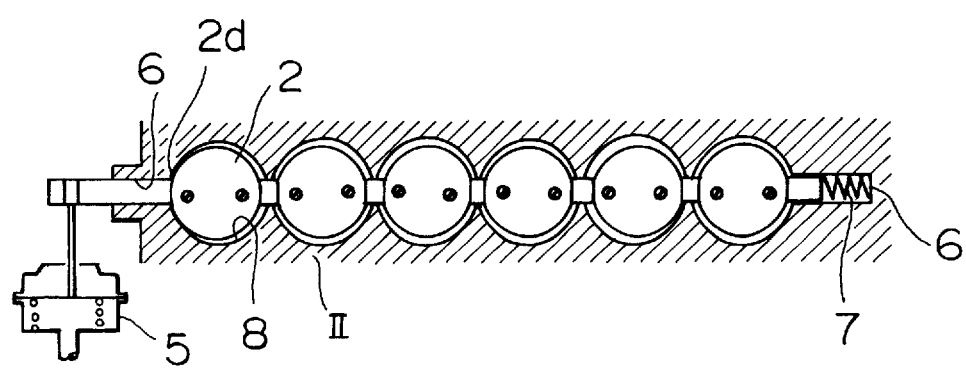
FIG. 3 shows a cross-sectional view illustrating a supporting structure of the multiple butterfly valve in the conventional technology.

Like in the conventional technology (refer to FIG. 2), in a type in which a rotary shaft 2a and a butterfly valve 2 are formed separately, and only the rotary shaft 2a is inserted from the external side to the bearing hole 6 provided in the valve body (II), then the butterfly valve 2 is mounted, the bearing hole 6 itself formed in the main body of the valve body (II) may be sufficient as a bearing supporting the intermediate section of the rotary shaft, but on the other hand, in the configuration like the present embodiment in which a butterfly valve and a rotary shaft are monolithically formed, the rotary shaft can not be inserted to the bearing hole from the external side of the valve body.

Figure 15:
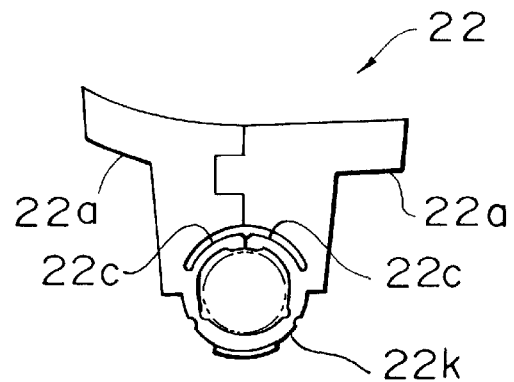
FIG. 15 to FIG. 18 are views each illustrating the bearing in the suction control device according to an embodiment of the present invention.
Figure 16:
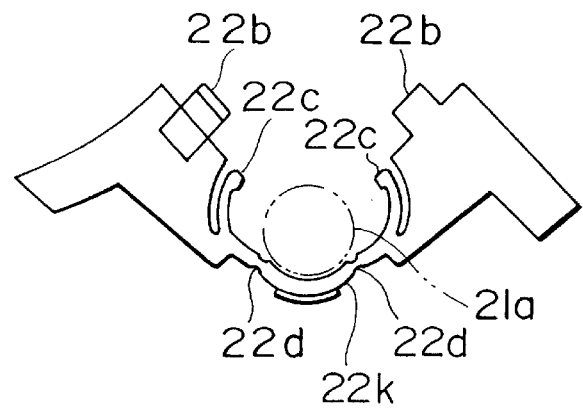
Figure 17:
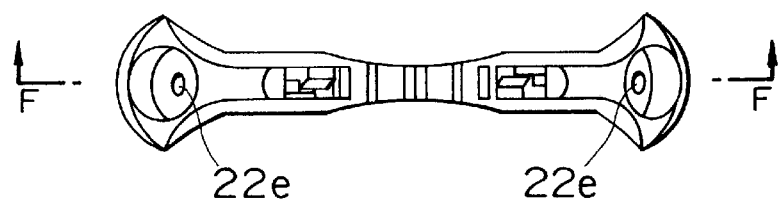
Figure 18:
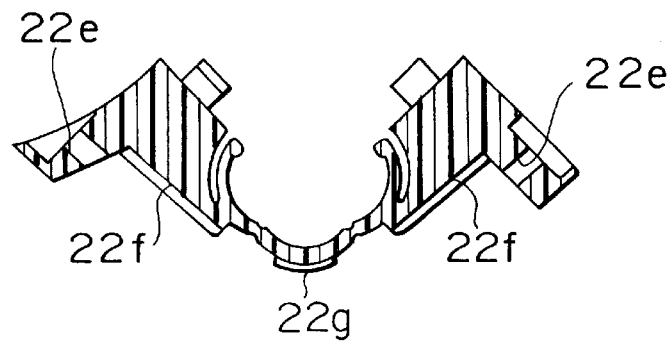
Figure 19:
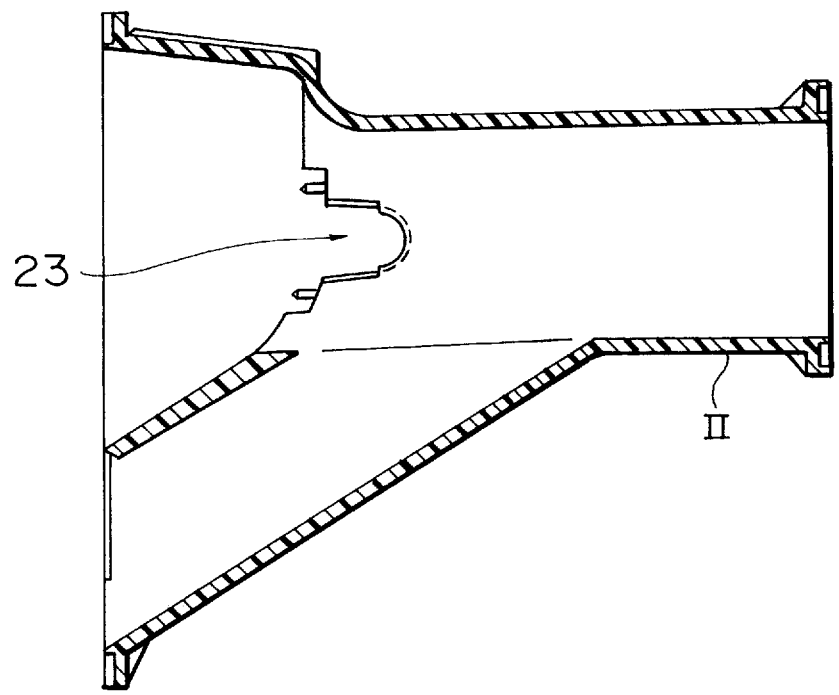
FIG. 19 is a cross-sectional view illustrating a bearing engagement section formed in the valve body (II)
Figure 20:
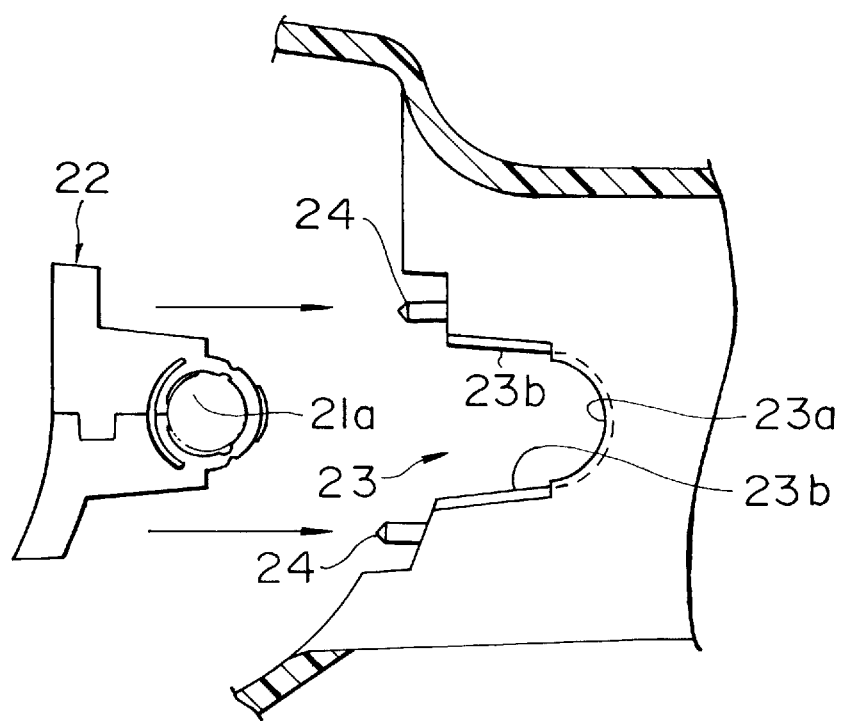
FIG. 20 is a view showing a manufacturing process for the intermediate bearing engaged in and fixed to the engagement section described above.

Therefore, in the present invention, as shown in FIG. 10, FIG. 15 to FIG. 18, and FIG. 19 to FIG. 20, the intermediate bearing 22 formed with a resin material is employed. The intermediate bearing 22 described above comprises a pair of engaging pieces 22a as shown in FIG. 15 to FIG. 18. Herein, FIG. 15 shows a side view showing the state where the rotary shaft is supported; FIG. 16 shows a side view showing the state where the pair of engaging pieces are disengaged; FIG. 17 shows a plan view of FIG. 16; and FIG. 18 shows a cross-sectional view of the bearing taken along the line F—F in FIG. 17. As shown in these figures, a pair of engaging pieces 22a are connected rotatively to the base section of bearing 22k each via the thin section 22d respectively. The presence of the thin section 22d described above generates an effect as a joint, which makes it easy to engage and disengage a pair of engaging pieces 22a. Also, a pair of resilient contacting pieces 22c are monolithically formed in the bearing section supporting the rotary shaft 21a so that it presents a cantilever form as well as a portion of an arch. The pair of resilient contacting pieces 22c always energize the rotary shaft in the radial direction in the state where the rotary shaft 21a is supported at the bearing section, and for this reason the rotary shaft in the bearing hole is prevented from becoming loose. Also, with these resilient contacting pieces 22c, even if a clearance in the initial stage changes because of deformation caused by expansion or shrinkage each of the bearing and rotary shaft, the contacting pieces can contact and support each other by following the change, so that the bearing can keep on working accurately and precisely without being affected by such factors such as atmospheric temperature.

Herein, description is made for a sequence of assembling the monolithic type of multiple butterfly valve by using the intermediate bearing 22 described above. At first, the rotary shaft supporting sections at the five intermediate positions shown in FIG. 11 are located on the bearing support base 22k as shown in FIG. 16, and then a pair of engaging pieces 22 are engaged as shown in FIG. 15 and locked with a hooking claw 22b. The 5 pieces of intermediate bearings 22 in the state as described above are engaged in and fixed to a bearing engagement section 22f formed in the valve body (II). At the same time, the groove 22f and the arch-formed projection section 22g (refer to FIG. 18) formed in the intermediate bearing 22 each are engaged in the long size projection section 23b and the arch-formed groove 23a formed in the bearing engagement section 23, so that the intermediate bearing 22 can accurately be positioned.

Also, like the engaging operation described above, a set pin 24 formed in the bearing engagement section is inserted into the engagement hole 22e of the intermediate bearing 22, then an edge of the set pin 24 is deformed by adding thereto heat or vibration, namely an effect as a rivet is given thereto by means of heat caulking welding, so that the intermediate bearing 22 can accurately be fixed.

Figure 21:
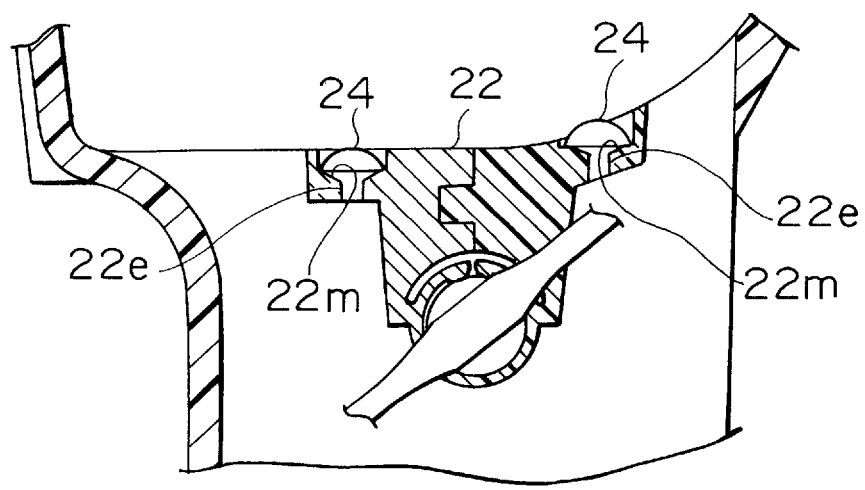
FIG. 21 is a cross-sectional view illustrating a state where the intermediate bearing is engaged in and fixed to the bearing engagement section of the valve body (II) by means of heat caulking welding.
Figure 22:
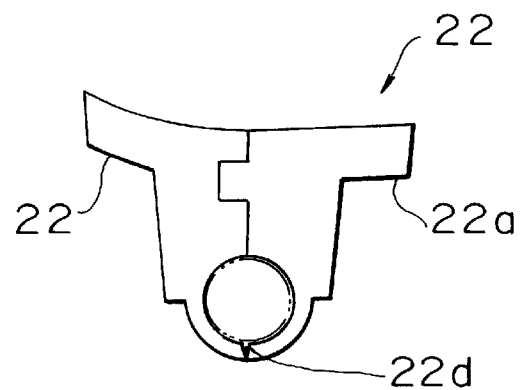
FIG. 22 to FIG. 25 are a side view, a plan view, and a cross-sectional view each illustrating appearance of the bearing in the suction control device according to another embodiment of the present invention.
Figure 23:
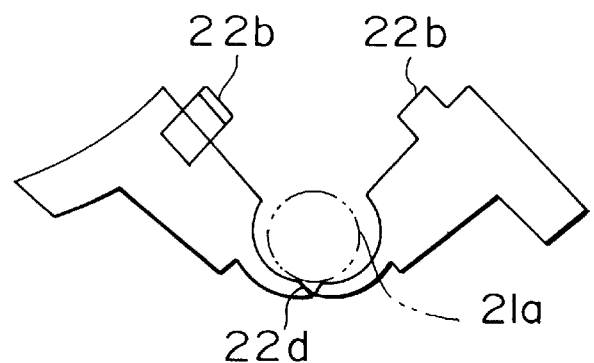
Figure 24:
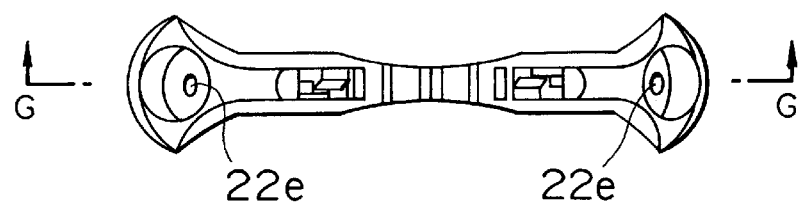
Figure 25:
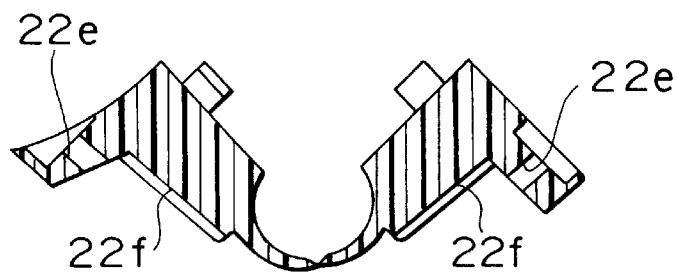

It should be noted that, when a fixing means with a set pin 24 is employed, as shown in FIG. 21, a chamfer 22 is provided in the upper section of the hole 22e, so that stress concentrated to the welding section after subjected to caulking welding by heat deformation can be loosened, and holding power by the set pin in the axial direction and the vertical direction can efficiently be achieved.

Figure 26:
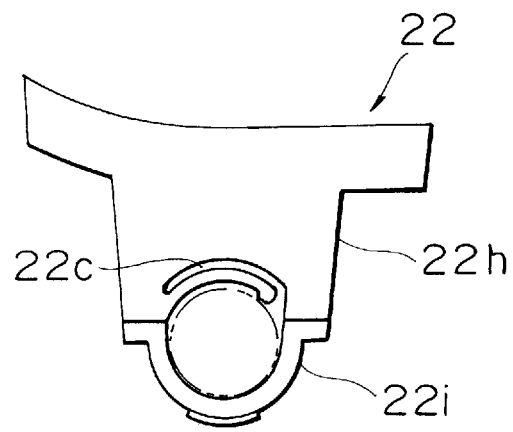
FIG. 26 is a side view illustrating appearance of the bearing in the suction control device according to another embodiment of the present invention.
Figure 27:
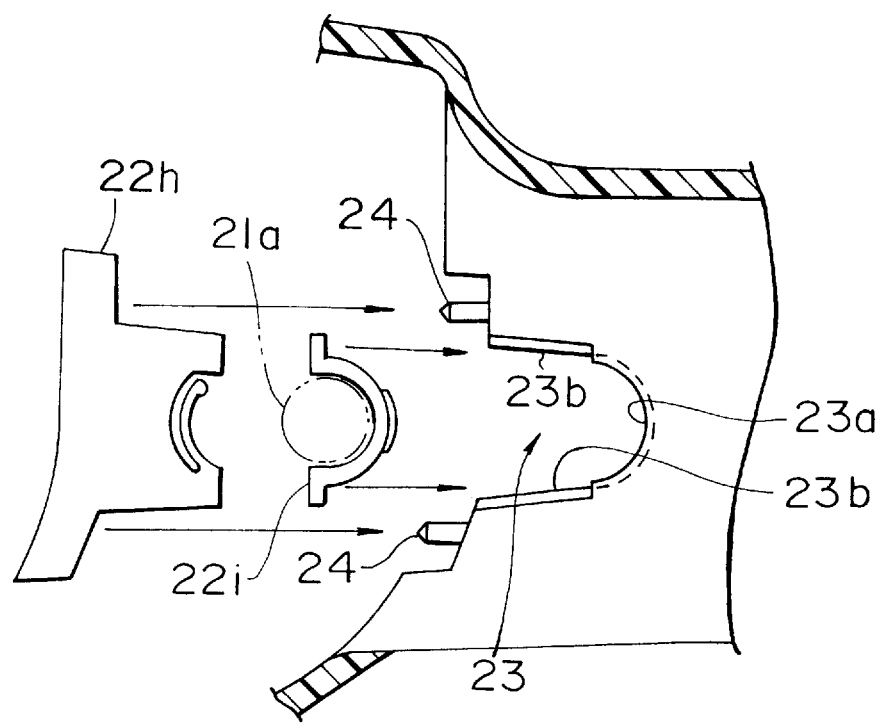
FIG. 27 is a view illustrating a manufacturing process for the bearing described above engaged in and fixed to the bearing engagement section described above.

As for another embodiment of the intermediate bearing 22, as shown in FIG. 22 to FIG. 25, the thin section 22d is provided in the edge of bearing area, and a pair of engaging pieces 22a can easily be engaged and disengaged, or, as shown in FIG. 26 and FIG. 27, the bearing section can have two components such as a half bearing 22i and a bearing cap 22h by being divided into half.

Figure 28:
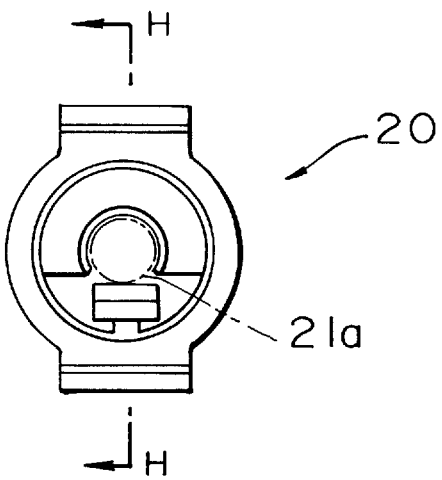
FIG. 28 is a front view illustrating an end bearing supporting the end section of the monolithic type of multiple butterfly valve in the suction control device according to the present invention.
Figure 29:
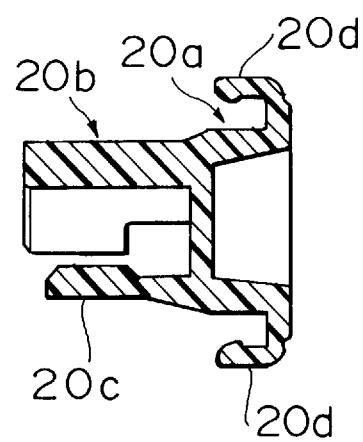
FIG. 29 is a cross-sectional view illustrating the end bearing taken along the line H—H in FIG. 28.

Next description is made for an end bearing formed with a resin material indicated by the reference numeral 20 in FIG. 8. The end bearing 20 supporting one edge of the rotary shaft of the monolithic type of multiple butterfly valve comprises, as shown in FIG. 28 and FIG. 29, a bearing section 20b supporting the rotary shaft 21a in the radial direction, a spigot joint section 20a for positioning by engaging the basic body of bearing 20 in the engagement hole provided in the valve body, and a hook section 20d connected to the valve body (II), and furthermore, a resilient contacting piece 20c always energizing and supporting the rotary shaft 21a in the radial direction is monolithically formed in a cantilever form in the bearing section 20.

The resilient contacting piece 20c described above is provided, so that the rotary shaft can be prevented from becoming loose in the bearing hole. In addition to the effect of preventing rattling, the role as a bearing function can accurately be achieved because it can follow a change in atmospheric temperature or the like.

Figure 30:
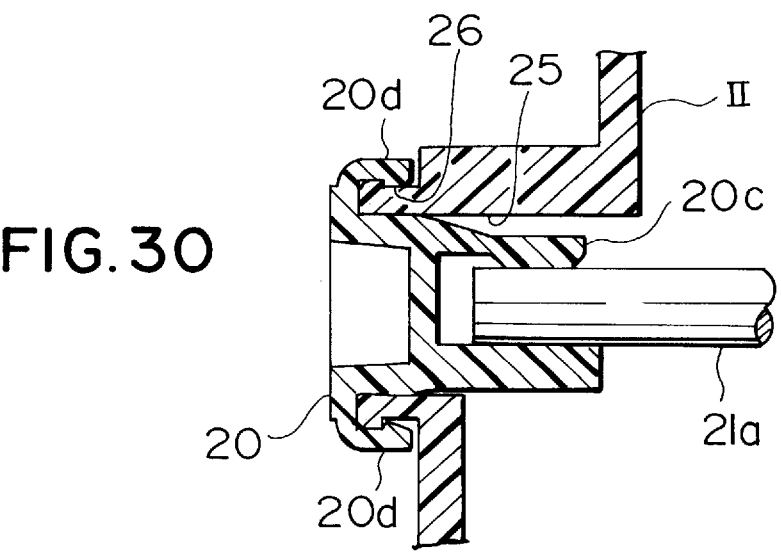
FIG. 30 is a cross-sectional view showing the state where the end bearing shown in FIG. 28

Also, as a sequence of assembling the end bearing 20, the monolithic type of multiple butterfly valve is supported by intermediate bearings 22 and located in the area of bearing engagement section 23 in the valve body (II), and then, as shown in FIG. 30, it is mounted by being engaged in and fixed from outside to the end bearing-hole for engagement opened on the peripheral side of the valve body (II). At this time, the basic body of bearing 20 is precisely positioned by means of engagement between the spigot joint 20a and the hole for engagement 25, and the hooking section 20d is engaged in the mounting flange 26 provided in the valve body (II), so that the disengagement is prevented, which makes engagement between the engagement more secured.

The monolithic type of multiple butterfly valve and the bearing therefor which are specific features in the suction control device according to the present invention described above are all formed by using a resin material, and it is an invention completed in the processing for forming them with resin, however, the present invention is not limited to a case of using a resin material, and it can also be applied to a case where other materials may be used for it.

As described above, with the suction control device for a multiple cylinder internal combustion engine of the present invention, weight reduction thereof can be achieved and mechanical strength thereof can be insured by forming it with resin or because of such effects as elimination of components for connection due to monolithic formation of a butterfly valve and a rotary shaft.

Also, with weight reduction of the butterfly valve itself, a supporting load on the bearing section becomes smaller and a degree of wearing of members in the sliding interface can be reduced.

Furthermore, with a bearing which is another specific feature of the present invention, even if a butterfly valve and a rotary shaft formed monolithically as described above is supported by the bearing, the assembly thereof becomes possible, and it is possible to prevent the rotary shaft becoming loose in the radial direction.

Also, even if the bearing described above is fixed to the bearing engagement section by heat caulking welding, stress concentrated thereon can be mitigated and mechanical strength can be insured by a conically beveled section provided in the edge section of a hole for a set pin subjected to heat caulking when inserted therein and engaged therewith.

Also, the rotary shaft can precisely be positioned by engaging the engaging section 20a of the bearing 20 in the hole for engagement 25 provided in the valve body (II) which is a shell body, and the rotary shaft can be supported by engaging the bearing section 20b to the rotary shaft from outside thereof. In this state, the resilient contacting piece 20c always energizes the rotary shaft in the radial direction, so that the rotary shaft can be prevented from becoming loose in the bearing hole and a function the bearing has by nature can accurately be operated even if wearing of the liding section or change in a clearance thereof occurs.

Next description is made for a second embodiment of the suction control device for a multiple cylinder internal combustion engine according to the present invention.

Figure 31:
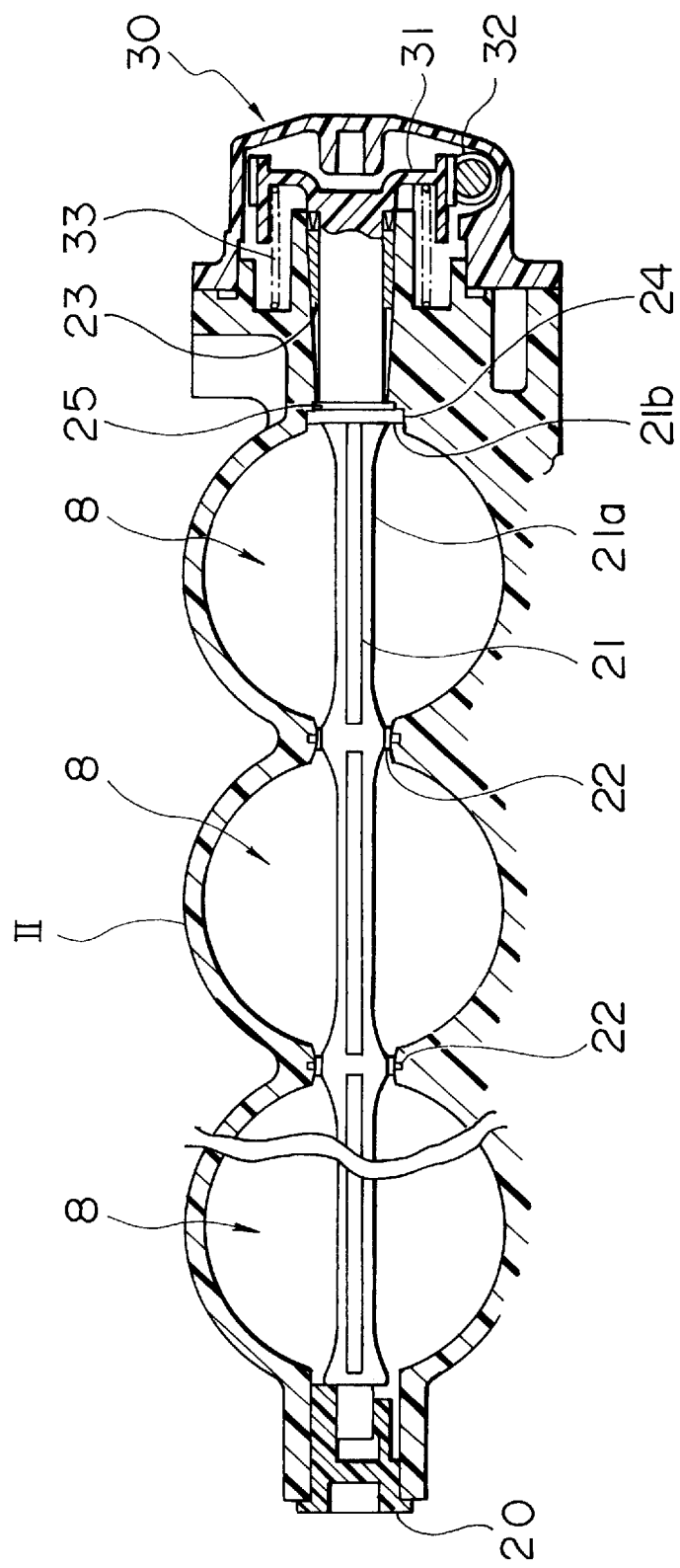
FIG. 31 is a cross-sectional view illustrating the device taken along the line B—B in FIG. 7, and illustrating an embodiment of the thrust bearing structure with specific features in the present invention.

FIG. 31 shows a cross-sectional view of the suction control device taken along the line B—B in FIG. 7, and the multiple butterfly valve for opening or closing the suction path 8 is provided in this area. As shown in this figure, in the multiple butterfly valve provided in the portion of valve body (II), a basic body of the valve 21 and a rotary shaft 21a supporting the basic body thereof are formed monolithically with a resin material. And one end of the rotary shaft 21a described above is supported by the bearing 20 and the rotary shaft located between the basic bodies of valves 21 is rotatably supported by the intermediate bearings 22.

Furthermore, an actuator 30 is connected to other end section of the rotary shaft 21a to actuate the multiple butterfly valve described above. In the actuator 30, if a worm 32 is rotated by a driving source such as a motor (not shown herein), a worm wheel 31 which is a torque delivery rotary member engaging therewith is rotated, then the rotary shaft 21a fixed monolithically to the worm wheel 31 is rotated. It should be noted that the bearing 23 is provided in the section for connection between the worm wheel 31 and the rotary shaft 21a, and the other end of multiple butterfly valve is rotatably supported thereby. Also, in the worm wheel 31, the internal side thereof is energized outwards by a coil spring 33 which is a resilient energizing member, and the expanding piece 21b monolithically formed with the rotary shaft 21a is contacted with the contacting wall 24 formed in the internal wall of the valve body (II) via a washer 25 having lubricity for improving sliding capability, thus effects as a thrust bearing being achieved.

With the thrust bearing structure described above, the expanding piece 21b and the contacting wall 24 are always (via the washer 25) contacting to and engaging with each other so that a multiple butterfly valve can be prevented from becoming loose in the axial direction because it is energized by energizing power of the coil spring 33.

Also, in this case, as shown in FIG. 31, the coil spring 33 is provided near the contacting area between the expanding piece 21b and the contacting piece 24, so that the energizing power can accurately and efficiently act to both of the contacting direction, and for this reason the multiple butterfly valve can precisely be positioned to the valve body (II).

Furthermore, the contacting wall 24 formed in the valve body (II) and the expanding piece 21b formed monolithically in the rotary shaft of the multiple butterfly valve described above are used as a reference point respectively for positioning thereof when each component are manufactured and assembled respectively, so that locating each valve 21 in the suction path 8 and sizing thereof can precisely be executed. For this reason, even if each component has been deformed caused by thermal expansion, functions as a valve can accurately be executed without generating any interference between the valve and the internal wall of the suction path.

Figure 32:
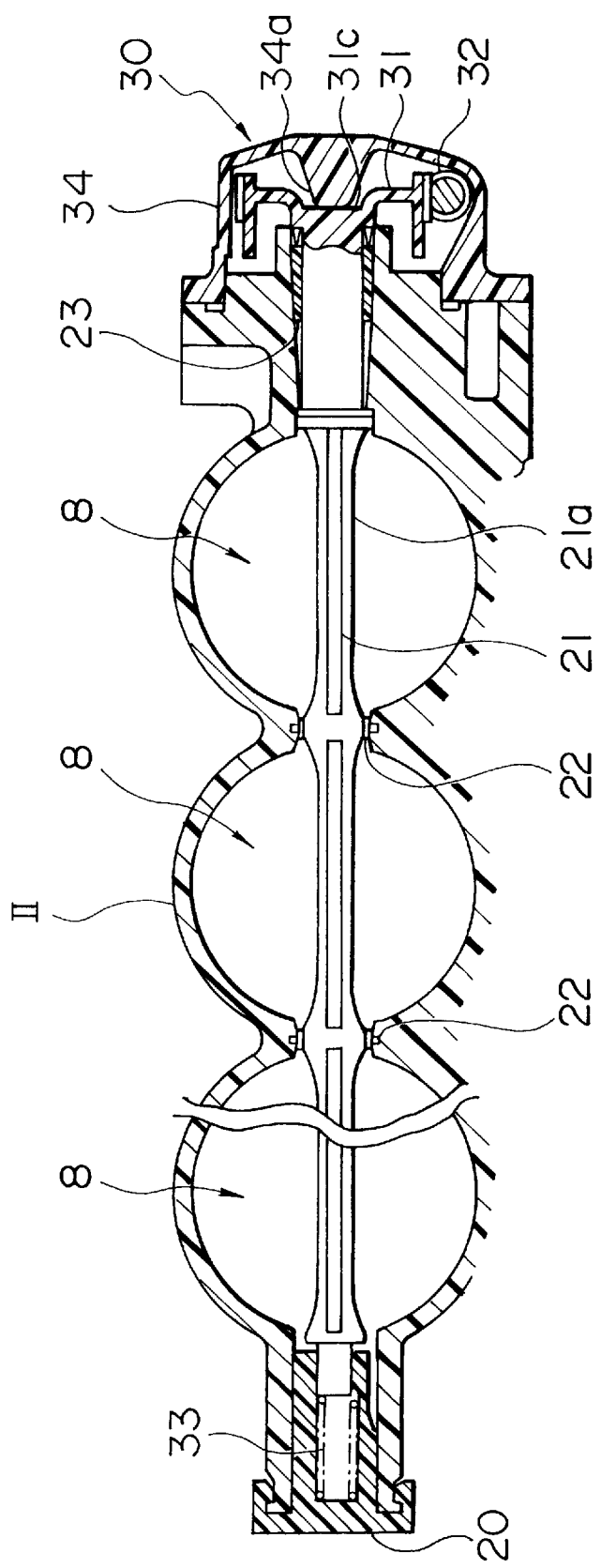
FIG. 32 shows another embodiment of the thrust bearing construction with specific features in the present invention.

Next description is made for another embodiment of the thrust bearing structure described above. FIG. 32 shows a cross-sectional view of the device in an area where the multiple butterfly valve is provided as shown in in FIG. 31. As shown in the figure, in the multiple butterfly valve, one end of the rotary shaft 21a is engaged in and connected with the worm wheel 31 which is a torque delivery rotary member, the end face 31c thereof is contacted to the contacting piece 34a monolithically formed in the internal wall of cover 34 in the actuator 30. Also, the coil spring 33 rotatably inserted into the end section bearing 20 is contacting the rotary shaft in the other end of the rotary shaft 21a, so that the rotary shaft 21a is energized to the side of the contacting piece 34a.

Figure 33:
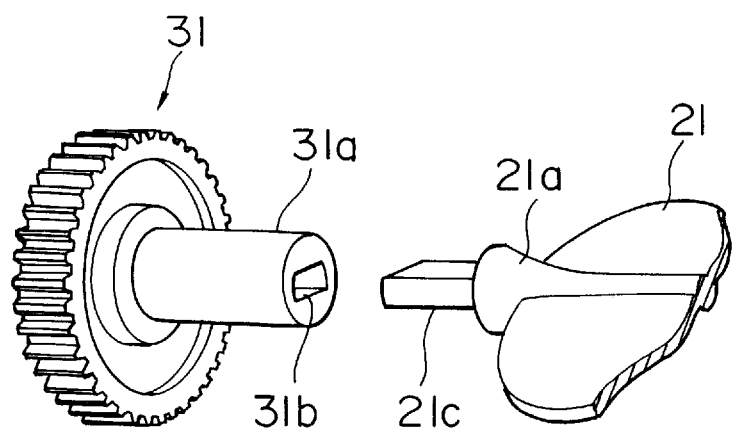
FIG. 33 is a perspective view illustrating a connected structure between the worm wheel and the rotary shaft according to the embodiment shown in FIG. 32.

Herein, description is made for connection between the worm wheel 31 and the rotary shaft 21a. As shown in FIG. 33, a cylindrical section 31a projecting from the peripheral surface thereof is provided in the worm wheel 31, and a hole for engagement 31b with a substantially rectangular and opening to the side of end section is formed inside thereof. On the other hand, formed at an end section of the rotary shaft 21a is an engaging shaft section 21c which are inserted and engaged in the hole for engagement 31b described above for rotating together with the rotary shaft. With the connection by means of engagement between the engaging shaft section 21c and the hole for engagement 31b, torque is accurately delivered to each other without causing idling.

In the thrust bearing structure described above, the movement of the rotary shaft can be controlled as well by positioning the rotary shaft to a specified position, thus the such a fault as rattling being prevented.

Next description is made for a sequence of assembling a monolithic type of multiple butterfly valve by using the intermediate bearing 22 described above. At first, the rotary shaft positioned between valves is located on the base section of the bearing 22k as shown in FIG. 16, then a pair of engaging pieces 22a are engaged in each other as described above to be locked with the hooks 22b thereof. Then the intermediate bearing 22 in the state described above is fixed to the bearing engaging section formed in the valve body (II) by being inserted thereinto and engaged therein in the direction vertical to planes of FIG. 31 and FIG. 32. At this time, the groove 22f and the arch-formed projecting section 22g (refer to FIG. 18) formed in the intermediate bearing 22 are engaged in the long size projection section and arch-formed groove (not shown) formed in the bearing engaging section respectively, which enables accurate positioning of the intermediate bearing 22.

When the intermediate bearing has been positioned and fixed, in the next process, one end of the rotary shaft 21a is inserted into the bearing 20 in the axial direction, and the other thereof is connected to and fixed to the worm wheel 31 via the coil spring 33 in the embodiment shown in FIG. 31. On the other hand, in the embodiment shown in FIG. 32, at first, the engaging shaft 21c positioned at one end of the rotary shaft is engaged in the hole for engagement 31b of the worm wheel 31 from outside thereof in the axial direction of the rotary shaft 21a, and the cover 34 is mounted to the worm wheel from outside thereof so that the contacting piece 34a is contacted and engaged in the end face 31c of the worm wheel 31. And the bearing 20 providing therein a coil spring 33 is engaged in the other end thereof to be in a state where the rotary shaft 21a is energized to the side of the worm wheel. With steps described above, assembly of the multiple butterfly valve is complete. Herein, a coil spring 33 and the end section bearing 20 can monolithically be formed with a resin material. In this case, it is advantageous that a coil spring 33 is formed in a cantilever-form like that of the resilient engaging piece 22c described above.

It should be noted that, the expanding piece 21b formed monolithically with the rotary shaft 21a and projecting in the radial direction (which can not be employed in a structure in which a rotary shaft be inserted from the peripheral side of the valve body thereinto for engagement like in the conventional technology) can be employed only because the method of assembling as described above is used.

As described above, with the suction control device for a multiple cylinder internal combustion engine, the expanding piece formed monolithically in the rotary shaft 21a is contacted and engaged in the contacting wall formed on the valve body which is a shell body, and furthermore, for instance, the rotary shaft is directly energized by a resilient energizing member so that this engaged state can always be maintained, and for this reason the rotary shaft does not become loose, and the multiple butterfly valve can accurately execute its opening/closing operation in each of the suction paths.

Also, as each butterfly valve and a suction path are formed with referring to a position wherein the expanding piece and the contacting wall are engaged with each other as a reference surface for positioning, positioning for each component as required in the conventional technology is not necessary, which enables easier work for assembly and a higher precision in alignment.

Furthermore a torque delivery rotary member for delivering torque to the rotary shaft is connected thereto by engagement, and the contacting piece is contacted from outside of the end face to the rotary shaft with an energizing force added to the other end of the rotary shaft by a resilient energizing member, so that various advantages such as prevention of rattling of the rotary shaft and easiness in assembly thereof are provided. Namely the rotary shaft and the torque delivery rotary member are not fixed to each other by a screw means or by welding, but the two components described above are simply engaged in and connected to each other, so that after the rotary shaft has been provided in the valve body, the state where the rotary shaft is accurately and precisely supported in the radial direction and the thrust direction can be maintained only by adding thereto inserting and engaging work from the axial direction.

As described above, by using resin as molding material, weight reduction of the device can be achieved and also accurate functions of the multiple butterfly valve is insured.

Next description is made for a third embodiment of the suction control device for a multiple cylinder internal combustion engine according to the present invention.

Figure 34:
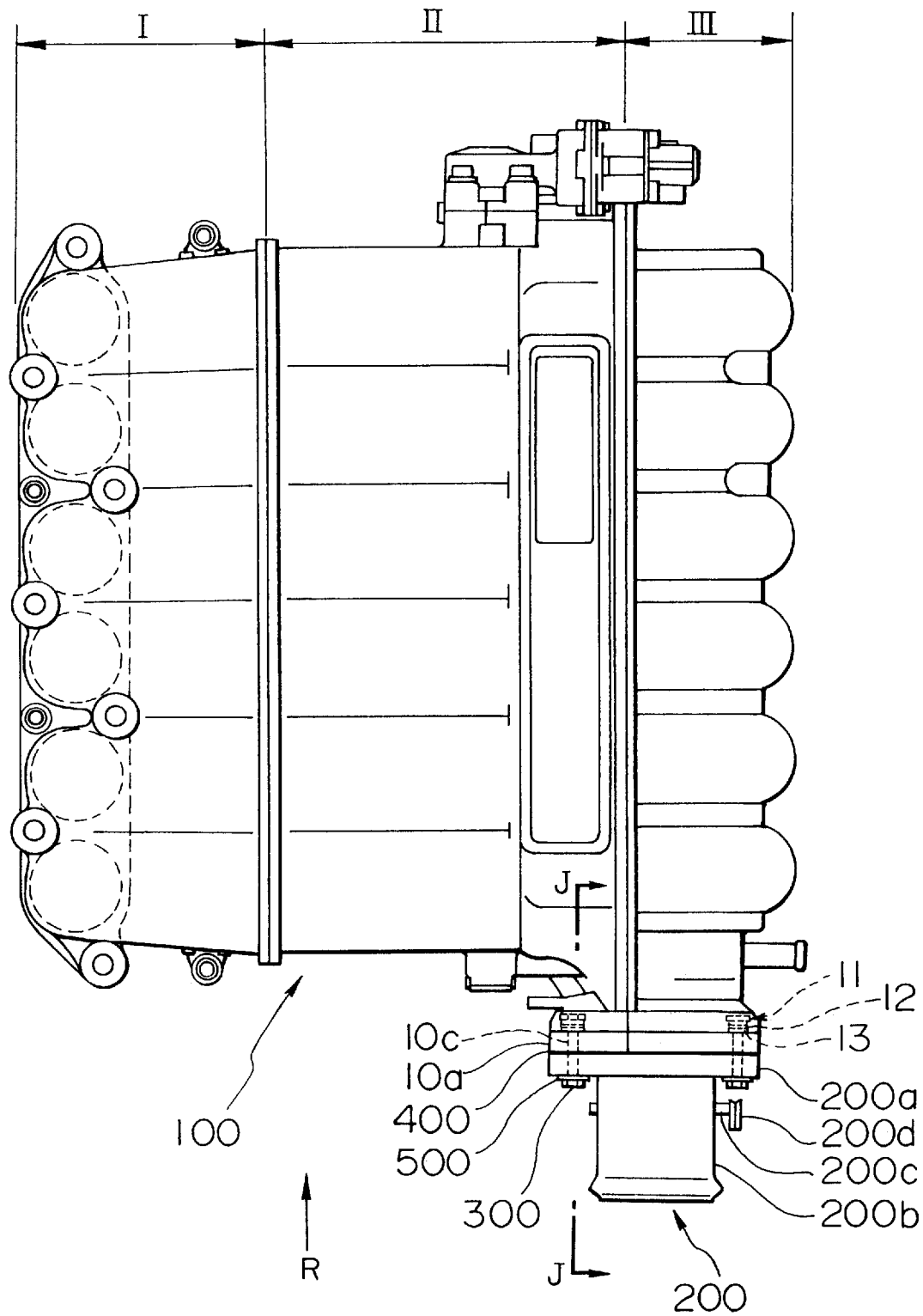
FIG. 34 is a plan view illustrating the suction device and throttle body employing the tightening structure according to the present invention and FIG. 35 is an external side view illustrating the suction device from the point of the arrow R shown in FIG. 34.

FIG. 34 shows a plan view illustrating an appearance of the basic body of the suction device in a state where the throttle body 200 is fixed to the basic body of suction device 100 by a connecting structure according to the present invention. As shown in the figure, the basic body of the suction device 100 comprises a combination of components formed by resin injection molding and presenting the following three areas of I, II, and III. Namely a portion of a branch (I) connected to the head intake port of engine, a portion of a valve body (II) presenting therein a multiple butterfly valves each opening/closing the suction path, and a covering portion (III) forming a surge tank and a roundabout suction path are discretely molded each by injection molding, and then connected through a respective flange surface to form a monolithic body by vibration welding.

Also, the flange section 10a for mounting thereon the throttle body 200 formed from an aluminium material or the like is monolithically formed with the same resin material as that used for the basic body of suction device 100 in the valve body portion (II) as well as for the covering portion (III).

Figure 4:
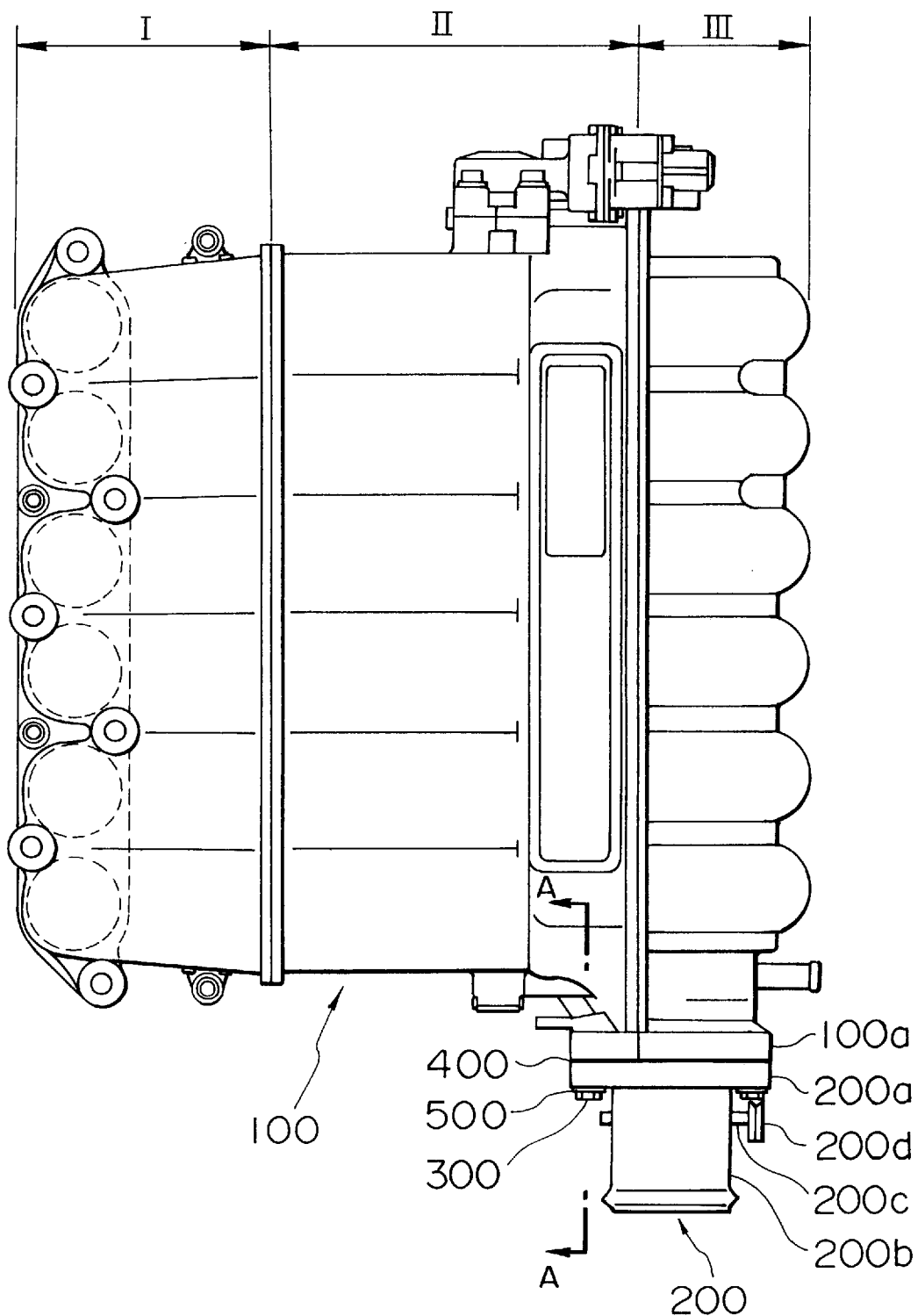
FIG. 4 shows a plan view illustrating the tightening state of the surge tank in a suction system with the throttle body in the conventional technology.
Figure 5:
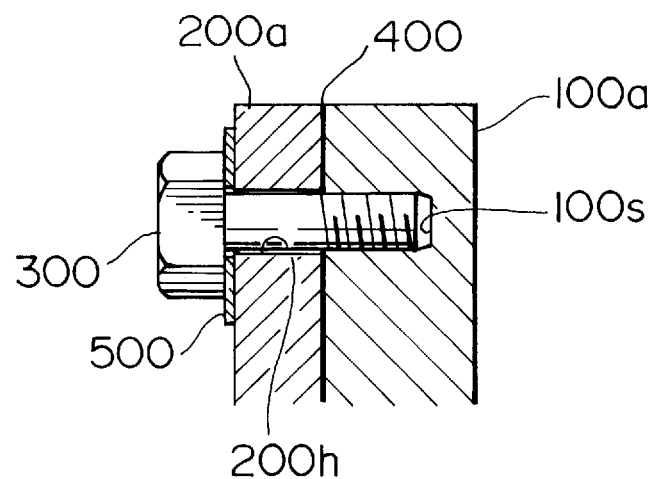
FIG. 5 shows a cross-sectional view illustrating the throttle body taken along the line A—A in FIG. 4.
Figure 6:
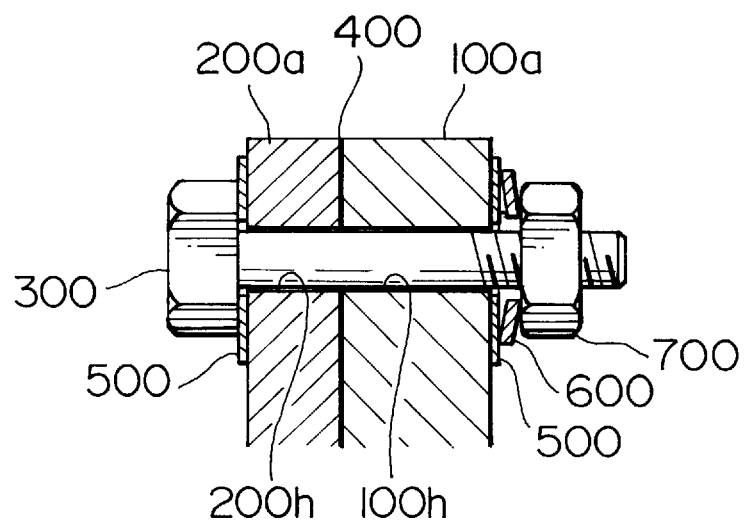
FIG. 6 shows prior art similar to FIG. 5.

It should be noted that, in FIG. 34, the same reference numerals as those in FIG. 4 are used to indicate the portions previously described.

Figure 35:
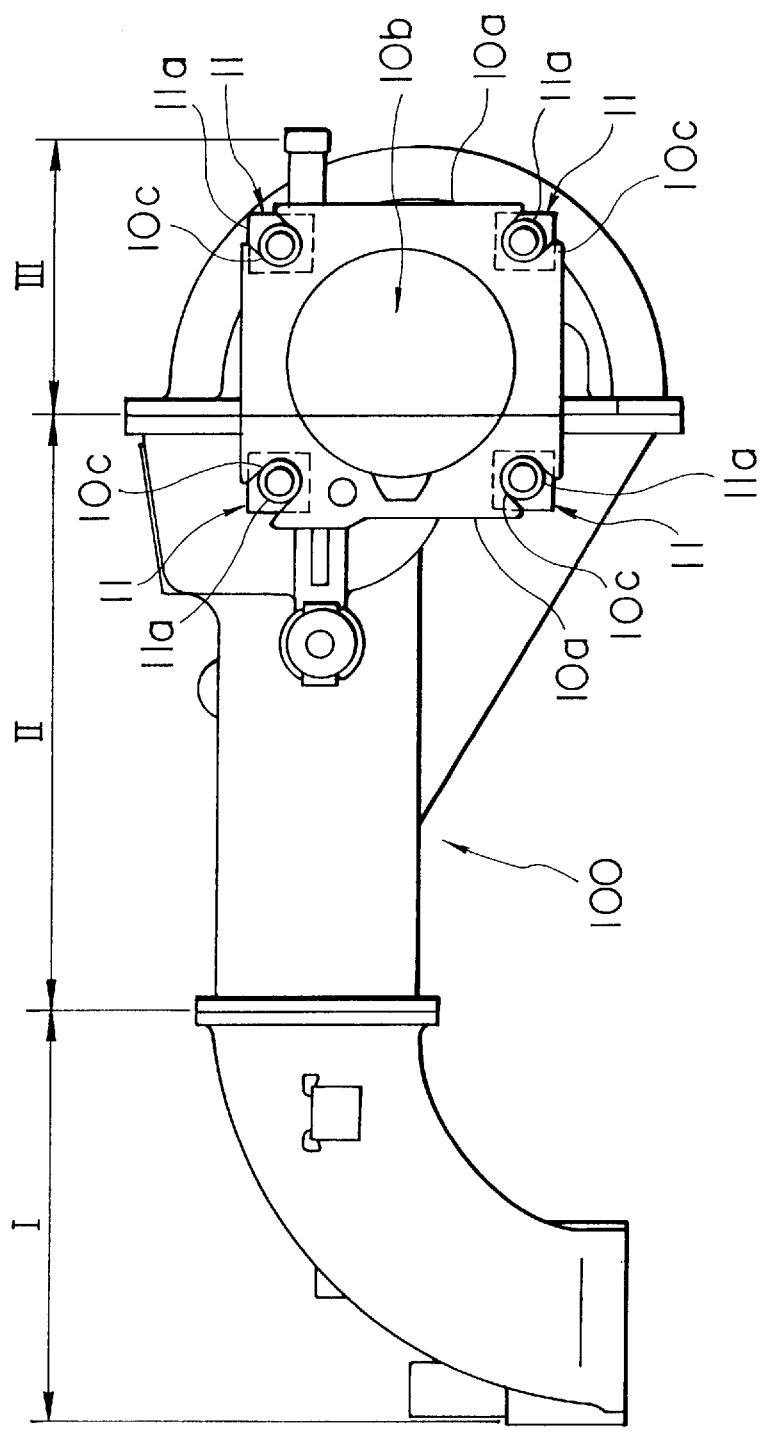

Next detailed description is made for the flange section 10a molded from a resin material. FIG. 35 shows a side view illustrating the basic body of suction device 100 from the point of the arrow R in FIG. 34 (showing a state where the throttle body 200 has not been located therein), and, as shown in the figure, the flange section 10a has a substantially rectangular form and an opening section 10b communicating the internal section of the surge tank to outside air is formed in the central section thereof.

Also, U-shaped notched engaging grooves 10c opening to outside in the diagonal direction of the flange face each are provided at four corners of the flange section 10a describe above. Then a cylindrical screw section 11a of the nut 11 with flange which is a portion of the connecting means described later is engaged in parallel with the flange face at the notched engaging groove 10c.

Figure 36:
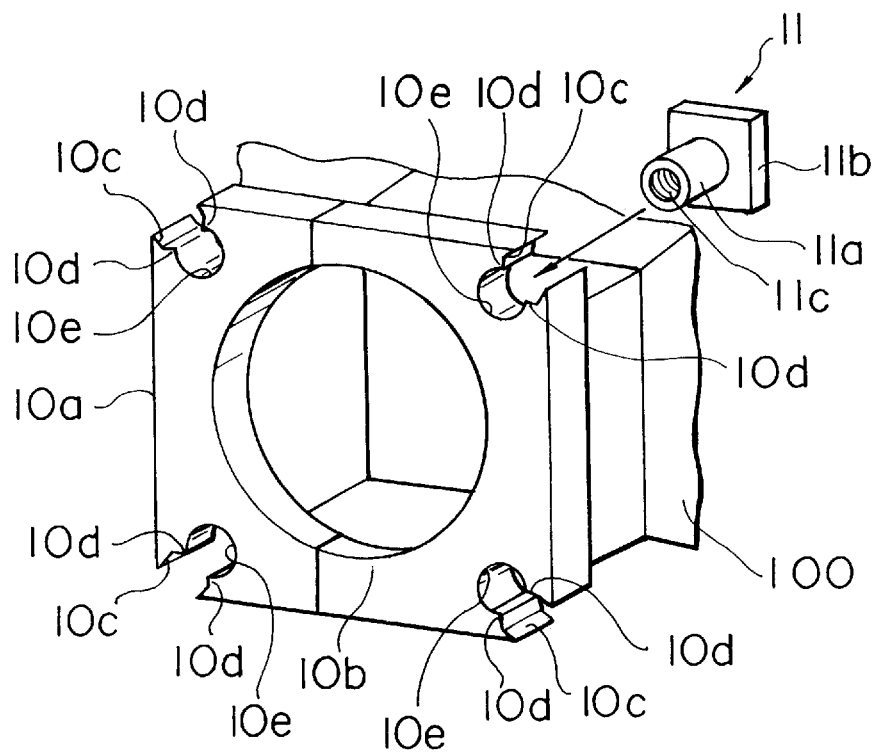
FIG. 36 and FIG. 37 each show an embodiment of the tightening structure according to the present invention.
Figure 37:
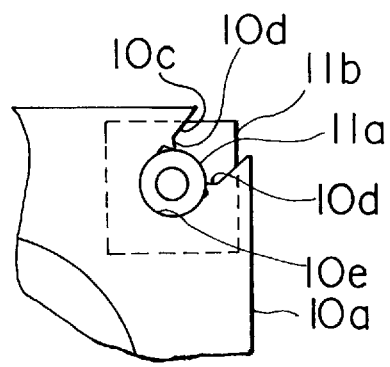

Next detailed description is made for an engaged relation between the notched engaging groove 10c and the nut 11. FIG. 36 and FIG. 37 respectively show views for explanation of the engagement relation described above, and FIG. 36 is a perspective view illustrating an appearance of a flange section 10 area of the suction system surge tank, while FIG. 37 is a partially enlarged view illustrating a state where the nut 11 is engaged in the notched engaging groove 10c. As shown in these two figures, a pair of projections 10d each opposed to the internal walls of the grooves are formed at the U-shaped notched engaging groove 10c provided at four corners of the flange sections 10a, and this portion is narrower in width as compared to other groove width. On the other hand, a nut 11 which is a portion of the connecting comprises a cylindrical screw section 11a in which a female screw groove 11c is formed in its internal wall and a rectangular flange section 11b having a width in the radial direction provided in the end section of the axial direction of the cylindrical screw section. And when a nut with flange 11 is to be inserted into and engaged in the notched engaging groove 10c, the cylindrical screw section of a nut with flange 11 is inserted from the side of opening of the notched engaging groove thereinto, and contacted to a pair of projections 10d, and herein, pushed thereinto by adding further a force to the cylindrical screw section, so that the cylindrical screw section 11a reaches the bottom section 10e of the notched engaging groove 10c, then the screw section is fixed so that it is held by the internal wall of the notched engaging groove 10c and the pair of projections 10d. At the same time, the pair of projections 10d are deformed within a range of their elasticity when the cylindrical screw section 11a is pushed into the groove, which enables insertion thereof, then the resilience of the projections recovered after their engagement is complete, namely a perimeter of the cylindrical screw section kept held and fixed therebetween by their spring action, so that a nut is prevented from dropping until when the throttle body 200 has completely been tightened and fixed.

The method of engaging a nut 11 in a U-shaped engaging groove 10c having an opening in one end in a direction parallel to a flange face is one of the most preferable methods of mounting especially in a case where no extra space is behind a flange face of the flange section 10a in the vertical direction. Because a circle hole can be employed if a moving stroke for inserting a cylindrical screw section can be ensured in the direction vertical to the flange face.

Figure 38:
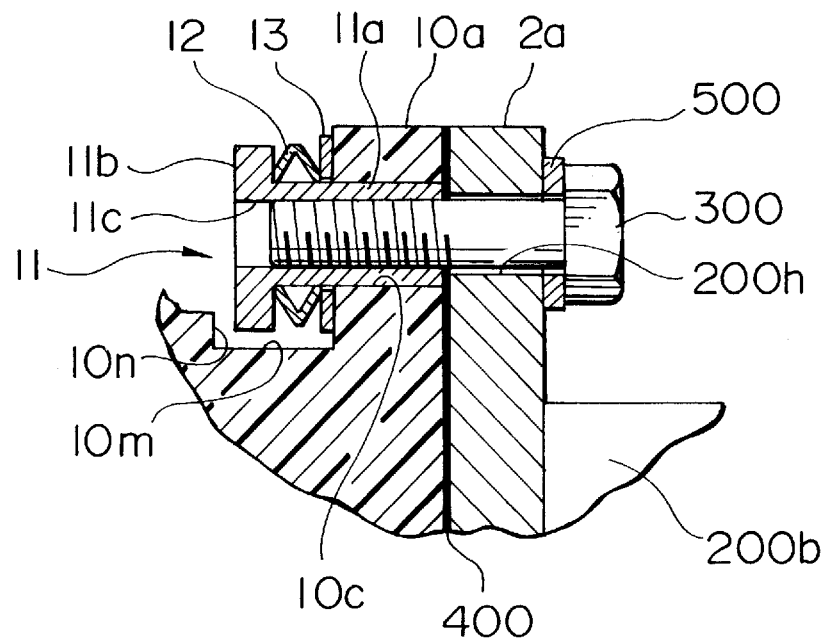
FIG. 38 shows an embodiment of the connecting structure according to the present invention, and is a cross-sectional view illustrating thereabove taken along the line J—J in FIG. 34.

Next description is made for a connecting method when a throttle body 200 is assembled to the basic body of suction device 100. FIG. 38 shows a cross-sectional view illustrating the basic body of suction device taken along the line J—J in FIG. 34, and as shown in the figure, the nut with flange 11 is engaged in the flange section 10a of the basic body of suction device in a state where a flat washer 13 and a pair of counter-sunk springs 12 are provided between the flange section 11b of the nut with flange 11 described above and the end face of the flange section 10a. And the flange section 200a of the throttle body 200 is contacted to the flange section 10a of the basic body of suction device via a seal member 400 so that two of the flange faces can firmly be stuck to each other, and furthermore the volt 300 incorporating therein a flat washer 500 is screwed to the screw groove 11c of the nut with flange 11 through the throughhole 200h.

With the connecting structure described above, the flange section 10a formed with a resin material is always energized to the flange section 200a of the throttle body to be stuck by a counter-sunk spring 12.

For this reason, even if the resin flange section 10a generates permanent distortion (settling) due to heat creep such as compression or deformation, the reduction in contacting strength with which the throttle body is stuck to the basic body thereof can be prevented by a spring power of the counter sunk spring, so that the connecting state of the two can accurately be secured from external vibration.

Especially, if a deformation rate of the resin flange section 10a is large, as shown in FIG. 38, it is preferable to provide a counter-sunk spring 12 in the side of flange section 10a because the spring power is directly effected thereover.

Figure 39:
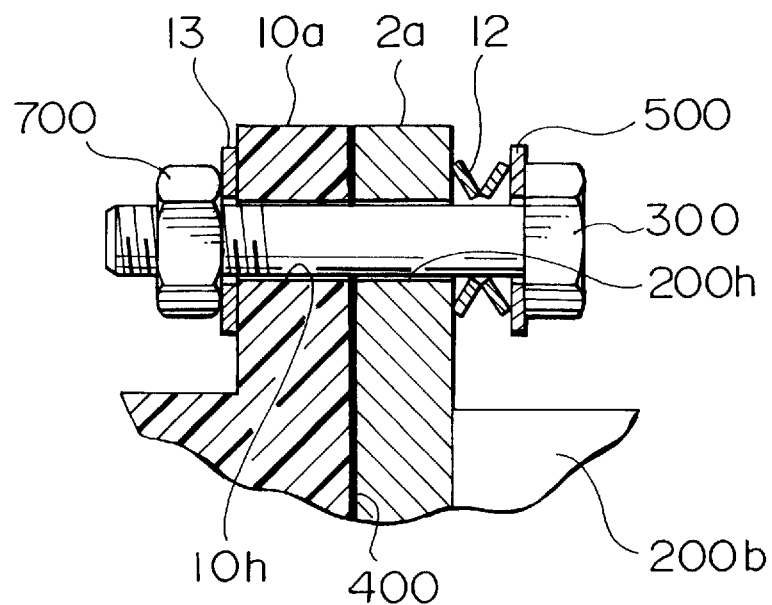
FIG. 39 is a cross-sectional view illustrating another connecting structure using a counter-sunk spring as a resilient member.

On the other hand, if a deformation rate of the resin flange section 10a is not so large, as shown in FIG. 39, it is allowable to employ a method of locating a plate (counter-sunk) spring 12 in the side of the flange section 200a of the throttle body by using the conventional type of volt 300 and nut 700.

Furthermore, in the structure where a nut with flange 11 is used as shown in FIG. 38, by forming a whirl-stop wall 10m or a drop-preventing wall 10n on a portion of the external wall of the basic body of the suction device 100, dropping of a nut can be prevented even if an engaged state between a nut with flange 11 and a notched engaging groove 10c is not tight enough. Therefore, a technique may be employed in which only the nut with flange 11 with a flat spring 12 and flat washer 13 previously incorporated therewith is assembled to a flange section of the flange surface 10a of the basic body of the suction device, and the throttle is assembled thereto in a different process, which insures easiness in a work for manufacturing and assembly and insures a larger freedom in a designing process.

As described above, with the structure for connection according to the present invention, a nut with flange comprising a cylindrical screw section having a female screw groove on the internal wall thereof and a rectangular flange section having a width in the radial direction at an end section in the axial direction of the cylindrical screw section described above is employed, and furthermore, a U-shaped notched engaging groove with one side opening to outside in the direction of flange face is formed in the flange section formed from a resin material, and a projection pressing the cylindrical screw section to the bottom section of the engaging groove in the state where the cylindrical screw section of the nut with flange is engaged in the engaging groove is provided in the internal wall of the engaging groove, so that it is easy to assemble the nut with flange to the flange section and the nut can be prevented from dropping, and for this reason, a nut is not required to be used held when tightening, and the tightening work can easily be carried out.

Also, by providing a resilient member energizing the flange section to a flange section in the other side in the side of flange section formed with a resin material, the flange section is connected with bolts and nuts. Therefore, even if the resin flange section generates plastic deformation due to heat creep or the like, reduction of the axial strength can be suppressed, so that contacted state of the two flange section can be maintained and also firm connection between the two components can strongly be maintained.

INDUSTRIAL AVAILABILITY

As described above, the suction control device for a multiple cylinder internal combustion engine according to the present invention can accurately executes the original functions thereof without fail and also enables weight reduction, so that it can advantageously and effectively be used in a combustion engine mounted on a vehicle or the like because of the fuel cost reduction realized by weight reduction.

What is claimed is:

1. A suction control device for a multiple cylinder internal combustion engine comprising:

a shell body being made from a resin material, and having suction paths each communicated to each cylinder in a multi-cylinder internal combustion engine;

a rotary shaft penetrating and born by said shell body;

butterfly valves each supported by said rotary shaft and provided in each of said suction paths so that said butterfly valves can freely open or close said suction paths respectively; and a bearing fixed onto said shell body and supporting said rotary shaft so that said rotary shaft can freely rotate, said butterfly valves and said rotary shaft being made from a monolithically molded resin material, said rotary shaft having a curved surface section in a border area between each pair of neighboring ones of said butterfly valves, each of said butterfly valves including a padding section having a streamlined form in the intake air flowing direction in a border area between said rotary shaft and each of said butterfly valves, and said bearing comprising:

a pair of engaging pieces being engageable with each other so as to radially bear said rotary shaft therebetween when they are engaged with each other, and a resilient contacting piece monolithically formed in a portion facing said rotary shaft of each of said engaging piece for radially urging said rotary shaft.

2. The suction control device for a multiple cylinder internal combustion engine according to claim 1, wherein said pair of engaging pieces are connected to each other in one of their respective end sections.

3. The suction control device for a multiple cylinder internal combustion engine according to claim 1, wherein each of said pair of engaging pieces is discretely formed as a separate body.

4. The suction control device for a multiple cylinder internal combustion engine according to claim 1, wherein said bearing further includes a base section which supports a portion of the periphery of said rotary shaft, and wherein each of said pair of engaging pieces is monolithically formed with said base section while being movable relative to each other.

5. The suction control device for a multiple cylinder internal combustion engine according to claim 1, wherein said shell body has a fixing pin for fixing said pair of engaging pieces to said shell body by means of heat caulking welding, and wherein each of said pair of engaging pieces has a hole for said fixing pin to be inserted therein and engaged therewith in an end section away from a section for supporting said rotary shaft in said engaging piece and also has a conical beveled section in an edge section of said hole for insertion and engagement in the side for heat-caulking welding.

* * * * *